United States Patent
Lou et al.

(10) Patent No.: US 12,513,570 B2
(45) Date of Patent: Dec. 30, 2025

(54) COMMUNICATION METHOD AND APPARATUS

(71) Applicant: HUAWEI TECHNOLOGIES CO., LTD., Shenzhen (CN)

(72) Inventors: Chong Lou, Shanghai (CN); Qiang Fan, Shanghai (CN); Xiaoying Xu, Shenzhen (CN); Feng Han, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 399 days.

(21) Appl. No.: 18/191,216

(22) Filed: Mar. 28, 2023

(65) Prior Publication Data
US 2023/0239737 A1    Jul. 27, 2023

Related U.S. Application Data

(63) Continuation of application No. PCT/CN2020/119716, filed on Sep. 30, 2020.

(51) Int. Cl.
*H04W 28/06* (2009.01)
*H04L 69/166* (2022.01)
(Continued)

(52) U.S. Cl.
CPC ......... *H04W 28/065* (2013.01); *H04L 69/166* (2013.01); *H04W 28/0268* (2013.01); *H04W 28/0273* (2013.01); *H04W 36/28* (2013.01)

(58) Field of Classification Search
CPC .......... H04W 28/065; H04W 28/0268; H04W 28/0273; H04W 36/28; H04L 69/166
See application file for complete search history.

(56) References Cited

U.S. PATENT DOCUMENTS

2016/0183158 A1    6/2016   Decarreau et al.
2018/0278676 A1*   9/2018   Kamen ................. G16H 10/60
(Continued)

FOREIGN PATENT DOCUMENTS

CN      108924872 A      11/2018
WO      2020097850 A1    5/2020

OTHER PUBLICATIONS

Huawei et al., "Study of Solutions and Radio Protocol Architecture for Dual-Connectivity" 3GPP TSG-RAN WG2 Meeting #81bis, R2-131164, Chicago, USA, Apr. 15-19, 2013, 12 pages.
(Continued)

*Primary Examiner* — Kevin M Cunningham
(74) *Attorney, Agent, or Firm* — Maier & Maier, PLLC

(57) ABSTRACT

A communication method and apparatus. The method may be applied to a 4G system, a 5G system, and/or a future communication system such as a 6G system. The method includes: a splitting protocol layer entity of a terminal device configures a first sequence number SN of a splitting protocol layer in a first splitting protocol layer data packet, and configures a second SN of the splitting protocol layer in a second splitting protocol layer data packet. The splitting protocol layer entity of the terminal device sends the first splitting protocol layer data packet to a first protocol layer entity corresponding to a first access network device, and sends the second splitting protocol layer data packet to a first protocol layer entity corresponding to a second access network device.

8 Claims, 7 Drawing Sheets

(51) Int. Cl.
*H04W 28/02* (2009.01)
*H04W 36/28* (2009.01)

(56) References Cited

U.S. PATENT DOCUMENTS

| | | | |
|---|---|---|---|
| 2021/0258111 A1* | 8/2021 | Xu | H04L 5/0044 |
| 2022/0150774 A1* | 5/2022 | Wu | H04W 36/305 |
| 2022/0182713 A1* | 6/2022 | Zhong | H04N 21/43635 |

OTHER PUBLICATIONS

"3rd Generation Partnership Project; Technical Specification Group Services and System Aspects; Service requirements for the 5G system; Stage 1(Release 17)", 3GPP TS 22.261 V17.3.0 (Jul. 2020), 83 pages.

"3rd Generation Partnership Project; Technical Specification Group Services and System Aspects; Study on enhancement of Ultra-Reliable Low-Latency Communication (URLLC) support in the 5G Core network (5GC)(Release 16)", 3GPP TR 23.725 V16.2.0 (Jun. 2019), 93 pages.

"3rd Generation Partnership Project; Technical Specification Group Radio Access Network; NR; Packet Data Convergence Protocol (PDCP) specification (Release 16)", 3GPP TS 38.323 V16.1.0 (Jul. 2020), 40 pages.

\* cited by examiner

COMMUNICATION METHOD AND APPARATUS

CROSS-REFERENCE TO RELATED APPLICATIONS

This application is a continuation of International Application No. PCT/CN2020/119716, filed on Sep. 30, 2020, the disclosure of which is hereby incorporated by reference in its entirety.

TECHNICAL FIELD

The embodiments relate to the communications field, a communication method, and an apparatus.

BACKGROUND

To improve a data transmission rate, a dual connectivity (DC) technology is introduced. A core network element and a terminal device may perform data communication by using a primary network device and a secondary network device, to improve the data transmission rate.

A packet data convergence protocol (PDCP) layer entity and a primary radio link control protocol (RLC) entity of a split bearer may be established in the primary network device, a secondary RLC entity is established in the secondary network device, and both the primary RLC entity and the secondary RLC entity are associated with the PDCP layer entity in the primary network device.

The terminal device sending uplink data may be used as an example. The primary network device receives data from the terminal device, and the PDCP layer entity of the primary network device sends a part of data to the primary RLC entity, and forwards the other part of data to the secondary RLC entity through an Xn interface, so that the data is transmitted to the core network element on two communication links, to improve a data transmission rate. However, when the primary network device forwards the data to the secondary network device through the Xn interface, a large data forwarding delay is caused, and a low delay requirement of data transmission cannot be met.

SUMMARY

The embodiments may provide a communication method and apparatus, so that a data transmission delay can be reduced while a data transmission rate is improved, thereby meeting a high rate requirement and a low delay requirement of data transmission.

To achieve the foregoing objective, the embodiments may use the following solutions.

According to a first aspect, a communication method is provided. The communication method includes: A splitting protocol layer entity of a terminal device configures a first sequence number (SN) of a splitting protocol layer in a first splitting protocol layer data packet, and configures a second SN of the splitting protocol layer in a second splitting protocol layer data packet. The splitting protocol layer entity of the terminal device sends the first splitting protocol layer data packet to a first protocol layer entity corresponding to a first access network device, and sends the second splitting protocol layer data packet to a first protocol layer entity corresponding to a second access network device. On a terminal device side, the splitting protocol layer is a protocol layer above a service data adaptation protocol SDAP layer.

Based on the communication method according to the first aspect, the splitting protocol layer entity of the terminal device separately sends different data packets to the first protocol layer entity corresponding to the first access network device and the first protocol layer entity corresponding to the second access network device. In this way, the terminal device transmits the data packets to the first access network device and the second access network device through Uu interfaces, to send the data packets to a core network element in splitting mode, thereby improving a data transmission rate. In addition, data can be prevented from being forwarded through an Xn interface, to reduce a delay in a data transmission process, thereby meeting a high rate requirement and a low delay requirement of data transmission. In addition, the terminal device allocates different sequence numbers SNs of splitting protocol layers to different data packets, so that the core network element receives the data packets, and may sort the data packets based on the SNs, thereby sequentially delivering the data packets to an upper layer.

It should be noted that the first protocol layer entity corresponding to the first access network device and the first protocol layer entity corresponding to the second access network device are both on a terminal device side.

In a possible solution, the splitting protocol layer may be determined based on first configuration information. The first configuration information may include first splitting indication information and/or a first threshold. The first splitting indication information may indicate whether a splitting protocol layer entity supports sending different data packets to the first protocol layer entity corresponding to the first access network device and the first protocol layer entity corresponding to the second access network device. The first threshold may indicate an amount threshold of to-be-sent data.

In this way, when the splitting protocol layer entity is configured to use a splitting function, and an amount of to-be-sent data is greater than or equal to the threshold, the terminal device transmits data packets to the first access network device and the second access network device through Uu interfaces, to send the data packets to the core network element in splitting mode. In addition, data can be prevented from being forwarded through an Xn interface, to reduce a delay in a data transmission process, thereby meeting a high rate requirement and a low delay requirement of data transmission.

In a possible solution, the first configuration information may include one or more of the following: a splitting protocol layer entity identifier, SN information, first reordering information, first reordering window information, first quality of service (QOS) flow information, first protocol data unit (PDU) session information, and first data radio bearer (DRB) information.

In a possible solution, the SN information may indicate a length of an SN of the splitting protocol layer, and the first reordering information may indicate whether received splitting protocol layer data packets are reordered in ascending order of SNs. The first reordering window information may indicate maximum time for waiting for a lost splitting protocol layer data packet, and the first QoS flow information may indicate a QoS flow identifier corresponding to the splitting protocol layer entity. The first PDU session information may indicate a PDU session identifier corresponding to the splitting protocol layer entity, and the first DRB information may indicate a DRB identifier corresponding to the splitting protocol layer entity.

In other words, the splitting protocol layer entity may have a reordering function. Therefore, when serving as a data receiver, the terminal device may sequentially deliver data packets to an upper layer. When time for waiting for a lost splitting protocol layer data packet is greater than or equal to duration indicated by the first reordering window information, the splitting protocol layer entity may first deliver a received data packet to an upper protocol layer, to further improve a data transmission rate.

In a possible solution, that the splitting protocol layer entity of the terminal device sends the first splitting protocol layer data packet to a first protocol layer entity corresponding to a first access network device, and sends the second splitting protocol layer data packet to a first protocol layer entity corresponding to a second access network device may include:

The splitting protocol layer entity of the terminal device may send, based on the first QoS flow information, the first PDU session information, or the first DRB information, the first splitting protocol layer data packet to the first protocol layer entity corresponding to the first access network device; and the splitting protocol layer entity of the terminal device may send, based on the first QoS flow information, the first PDU session information, or the first DRB information, the second splitting protocol layer data packet to the first protocol layer entity corresponding to the second access network device.

In other words, the terminal device may perform, based on the first QoS flow information, the first PDU session information, or the first DRB information, differentiated processing on data corresponding to different QoS flows, data corresponding to different PDU sessions, or data corresponding to different DRBs, to meet diversified data requirements.

In a possible solution, that a splitting protocol layer entity of a terminal device configures a first sequence number SN of a splitting protocol layer in a first splitting protocol layer data packet, and configures a second SN of the splitting protocol layer in a second splitting protocol layer data packet may include: The splitting protocol layer entity of the terminal device may configure the first SN of the splitting protocol layer in the first splitting protocol layer data packet and configure the second SN of the splitting protocol layer in the second splitting protocol layer data packet based on the SN information.

In other words, the splitting protocol layer entity of the terminal device may configure different SNs of the splitting protocol layer in different data packets at the splitting protocol layer based on the SN information, so that a receiver reorders the data packets based on the SNs in the data packets, to sequentially deliver the data packets to an upper layer.

In a possible solution, that the splitting protocol layer entity of the terminal device sends the first splitting protocol layer data packet to a first protocol layer entity corresponding to a first access network device, and sends the second splitting protocol layer data packet to a first protocol layer entity corresponding to a second access network device may include: When the first splitting indication information has a first value and an amount of data to be sent by the splitting protocol layer entity of the terminal device is greater than or equal to the first threshold, the splitting protocol layer entity of the terminal device may send the first splitting protocol layer data packet to the first protocol layer entity corresponding to the first access network device, and sends the second splitting protocol layer data packet to the first protocol layer entity corresponding to the second access network device.

In this way, when the splitting protocol layer entity is configured to enable a splitting function, and an amount of to-be-sent data is greater than or equal to the threshold, the splitting protocol layer entity may separately send different data packets to different first protocol layer entities corresponding to different access network devices. In this way, the terminal device sends different data packets to different access network devices through Uu interfaces, to send the data packets to the core network element in splitting mode, so that a data transmission rate can be improved. Forwarding does not need to be performed through an Xn interface between access network devices, to reduce a delay in a data transmission process.

In a possible solution, the communication method according to the first aspect may further include: The terminal device may receive a first message, where the first message may include the first configuration information, and the first message may indicate the terminal device to determine the splitting protocol layer based on the first configuration information.

In this way, the terminal device may create or configure a splitting protocol layer, to send different data packets to different access network devices through Uu interfaces, to send the data packets to the core network element in splitting mode without forwarding through an Xn interface between access network devices, thereby reducing a delay in a data transmission process.

According to a second aspect, a communication method is provided. The communication method includes: A splitting protocol layer entity of a core network element receives a first splitting protocol layer data packet and a second splitting protocol layer data packet from a first protocol layer entity, and the splitting protocol layer entity of the core network element sends a parsed first splitting protocol layer data packet and a parsed second splitting protocol layer data packet to an upper protocol layer entity of the splitting protocol layer entity in ascending order of SNs in a first SN and a second SN. The first splitting protocol layer data packet includes the first sequence number SN of a splitting protocol layer, the second splitting protocol layer data packet includes the second SN of the splitting protocol layer, and the splitting protocol layer is a protocol layer above a general packet radio service tunneling protocol (GTP) protocol layer.

In a possible solution, the communication method according to the second aspect may further include: The core network element may generate first configuration information, where the first configuration information may be used to configure a splitting protocol layer of a terminal device, and the splitting protocol layer of the terminal device corresponds to the splitting protocol layer of the core network element.

In other words, configuration information of the splitting protocol layer of the terminal device may be determined by the core network element, and the splitting protocol layer of the terminal device may be a newly configured or newly created protocol layer.

In a possible solution, the first configuration information may include first splitting indication information and/or a first threshold, and the first splitting indication information may indicate whether a splitting protocol layer entity supports sending different data packets to a first protocol layer entity corresponding to a first access network device and a first protocol layer entity corresponding to a second access network device. The first threshold may indicate an amount threshold of to-be-sent data.

In a possible solution, the first configuration information may include one or more of the following: a splitting protocol layer entity identifier, SN information, first reordering information, first reordering window information, first quality of service QoS flow information, first protocol data unit PDU session information, and first data radio bearer DRB information.

In a possible solution, the SN information may indicate a length of an SN of the splitting protocol layer, and the first reordering information may indicate whether received splitting protocol layer data packets are reordered in ascending order of SNs. The first reordering window information may indicate maximum time for waiting for a lost splitting protocol layer data packet. The first QoS flow information may indicate a QoS flow identifier corresponding to the splitting protocol layer entity, and the first PDU session information may indicate a PDU session identifier corresponding to the splitting protocol layer entity. The first DRB information may indicate a DRB identifier corresponding to the splitting protocol layer entity.

In a possible solution, the communication method according to the second aspect may further include: The splitting protocol layer entity of the core network element may obtain first reordering information corresponding to a first QoS flow. If the first reordering information has a second value, the splitting protocol layer entity of the core network element may send the parsed first splitting protocol layer data packet and the parsed second splitting protocol layer data packet to the upper protocol layer entity of the splitting protocol layer entity in ascending order of the SNs in the first SN and the second SN. The first QoS flow may be for transmitting a splitting protocol layer data packet.

That is, when there is a reordering requirement, the splitting protocol layer entity of the core network element may sort data packets, to sequentially deliver the data packets to an upper layer.

In a possible solution, the communication method according to the second aspect may further include: when first reordering information has a second value, and time for the splitting protocol layer entity of the core network element to wait for a lost splitting protocol layer data packet is greater than or equal to first reordering window information, the splitting protocol layer entity of the core network element may send received splitting protocol layer data packets to the upper protocol layer entity of the splitting protocol layer entity in ascending order of SNs.

That is, when there is a reordering requirement, and time for the splitting protocol layer entity to wait for a lost splitting protocol layer data packet is greater than or equal to duration indicated by the first reordering window information, the splitting protocol layer entity of the core network element may first sequentially deliver received data packets to an upper protocol layer, to further improve a data transmission rate.

In a possible solution, the communication method according to the second aspect may further include: The core network element may send a first message. The first message may include the first configuration information, and the first message may indicate the terminal device to determine the splitting protocol layer based on the first configuration information.

In addition, for an effect of the communication method in the second aspect, refer to the effect of the communication method in any implementation of the first aspect. Details are not described herein again.

According to a third aspect, a communication method is provided. The communication method includes: A first protocol layer entity of a terminal device sends a third splitting protocol layer data packet and a fourth splitting protocol layer data packet to a splitting protocol layer entity of the terminal device; and the splitting protocol layer entity of the terminal device sends a parsed third splitting protocol layer data packet and a parsed fourth splitting protocol layer data packet to an upper protocol layer entity of the splitting protocol layer entity in ascending order of SNs in a third SN and a fourth SN. The third splitting protocol layer data packet includes the third sequence number SN of a splitting protocol layer, the fourth splitting protocol layer data packet includes the fourth SN of the splitting protocol layer, and the splitting protocol layer is a protocol layer above a service data adaptation protocol SDAP layer Based on the communication method according to the third aspect, the splitting protocol layer entity of the core network element separately sends different data packets to a first protocol layer entity corresponding to a first access network device and a first protocol layer entity corresponding to a second access network device. In this way, the core network element transmits the data packets to the first access network device and the second access network device through Uu interfaces, to send the data packets to the terminal device in splitting mode, thereby improving a data transmission rate. In addition, data can be prevented from being forwarded through an Xn interface, to reduce a delay in a data transmission process, thereby meeting a high rate requirement and a low delay requirement of data transmission. In addition, the core network element allocates different SNs of splitting protocol layers to different data packets, so that the terminal device receives the data packets, and may sort the data packets based on the SNs, thereby sequentially delivering the data packets to an upper layer.

In a possible solution, the splitting protocol layer may be determined based on first configuration information. The first configuration information may include first splitting indication information and/or a first threshold. The first splitting indication information may indicate whether a splitting protocol layer entity supports sending different data packets to the first protocol layer entity corresponding to the first access network device and the first protocol layer entity corresponding to the second access network device. The first threshold may indicate an amount threshold of to-be-sent data.

In this way, when the splitting protocol layer entity is configured to enable a splitting function, and an amount of to-be-sent data is greater than or equal to the threshold, the terminal device transmits data packets to the first access network device and the second access network device through Uu interfaces, to send the data packets to the core network element in splitting mode. In addition, data can be prevented from being forwarded through an Xn interface, to reduce a delay in a data transmission process, thereby meeting a high rate requirement and a low delay requirement of data transmission.

In a possible solution, the first configuration information may include one or more of the following: a splitting protocol layer entity identifier, SN information, first reordering information, first reordering window information, first quality of service (QOS) flow information, first protocol data unit (PDU) session information, and first data radio bearer (DRB) information.

In a possible solution, the SN information may indicate a length of an SN of the splitting protocol layer, and the first reordering information may indicate whether received splitting protocol layer data packets are reordered in ascending order of SNs. The first reordering window information may indicate maximum time for waiting for a lost splitting protocol layer data packet, and the first QoS flow information may indicate a QoS flow identifier corresponding to the splitting protocol layer entity. The first PDU session information may indicate a PDU session identifier corresponding to the splitting protocol layer entity, and the first DRB information may indicate a DRB identifier corresponding to the splitting protocol layer entity.

In other words, the splitting protocol layer entity may have a reordering function. Therefore, when serving as a data receiver, the terminal device may sequentially deliver data packets to an upper layer. When time for waiting for a lost splitting protocol layer data packet is greater than or equal to duration indicated by the first reordering window information, the splitting protocol layer entity may first deliver a received data packet to an upper protocol layer, to further improve a data transmission rate.

In a possible solution, that a first protocol layer entity of a terminal device sends a third splitting protocol layer data packet and a fourth splitting protocol layer data packet to a splitting protocol layer entity of the terminal device may include: The first protocol layer entity of the terminal device may send, based on the first QoS flow information, the first PDU session information, or the first DRB information, the third splitting protocol layer data packet to the splitting protocol layer entity of the terminal device; and the first protocol layer entity of the terminal device may send, based on the first QoS flow information, the first PDU session information, or the first DRB information, the fourth splitting protocol layer data packet to the splitting protocol layer entity of the terminal device.

In other words, the terminal device may perform, based on the first QoS flow information, the first PDU session information, or the first DRB information, differentiated processing on data corresponding to different QoS flows, data corresponding to different PDU sessions, or data corresponding to different DRBs, to meet diversified data requirements.

In a possible solution, the communication method according to the third aspect may further include: if first reordering information has a second value, the splitting protocol layer entity of the terminal device may send the parsed third splitting protocol layer data packet and the parsed fourth splitting protocol layer data packet to the upper protocol layer entity of the splitting protocol layer entity in ascending order of the SNs in the third SN and the fourth SN.

That is, when there is a reordering requirement, the splitting protocol layer entity of the terminal device may sort data packets, to sequentially deliver the data packets to an upper layer.

In a possible solution, the communication method according to the third aspect may further include: when first reordering information has a second value, and time for the splitting protocol layer entity of the terminal device to wait for a lost splitting protocol layer data packet is greater than or equal to first reordering window information, the splitting protocol layer entity of the terminal device may send received splitting protocol layer data packets to the upper protocol layer entity of the splitting protocol layer entity in ascending order of SNs.

That is, when there is a reordering requirement, and time for the splitting protocol layer entity to wait for a lost splitting protocol layer data packet is greater than or equal to duration indicated by the first reordering window information, the splitting protocol layer entity of the terminal device may first sequentially deliver received data packets to an upper protocol layer, to further improve a data transmission rate.

In a possible solution, the communication method according to the third aspect may further include: The terminal device may receive a first message. The first message may include the first configuration information, and the first message may indicate the terminal device to determine the splitting protocol layer based on the first configuration information.

In this way, the terminal device may create or configure a splitting protocol layer, to send different data packets to different access network devices through Uu interfaces, to send the data packets to the core network element in splitting mode without forwarding through an Xn interface between access network devices, thereby reducing a delay in a data transmission process.

According to a fourth aspect, a communication method is provided. The communication method includes: A splitting protocol layer entity of a core network element configures a third sequence number SN of a splitting protocol layer in a third splitting protocol layer data packet, and configures a fourth SN of the splitting protocol layer in a fourth splitting protocol layer data packet; and the splitting protocol layer entity of the core network element sends the third splitting protocol layer data packet to a first protocol layer entity corresponding to a first access network device, and sends the fourth splitting protocol layer data packet to a first protocol layer entity corresponding to a second access network device. The splitting protocol layer is a protocol layer above a general packet radio service tunneling protocol (GTP) protocol layer.

It should be noted that the first protocol layer entity corresponding to the first access network device and the first protocol layer entity corresponding to the second access network device are both on a core network element side.

In a possible solution, the communication method according to the fourth aspect may further include: The core network element may generate first configuration information, where the first configuration information may be used to configure a splitting protocol layer of a terminal device, and the splitting protocol layer of the terminal device corresponds to the splitting protocol layer of the core network element.

In other words, configuration information of the splitting protocol layer of the terminal device may be determined by the core network element, and the splitting protocol layer of the terminal device may be a newly configured or newly created protocol layer.

In a possible solution, the first configuration information may include first splitting indication information and/or a first threshold, and the first splitting indication information may indicate whether a splitting protocol layer entity supports sending different data packets to a first protocol layer entity corresponding to a first access network device and a first protocol layer entity corresponding to a second access network device. The first threshold may indicate an amount threshold of to-be-sent data.

In a possible solution, the first configuration information may include one or more of the following: a splitting protocol layer entity identifier, SN information, first reordering information, first reordering window information, first quality of service (QOS) flow information, first protocol data unit (PDU) session information, and first data radio bearer (DRB) information.

In a possible solution, the SN information may indicate a length of an SN of the splitting protocol layer, and the first reordering information may indicate whether received splitting protocol layer data packets are reordered in ascending order of SNs. The first reordering window information may indicate maximum time for waiting for a lost splitting protocol layer data packet, and the first QoS flow information may indicate a QoS flow identifier corresponding to the splitting protocol layer entity. The first PDU session information may indicate a PDU session identifier corresponding to the splitting protocol layer entity, and the first DRB information may indicate a DRB identifier corresponding to the splitting protocol layer entity.

In a possible solution, that a splitting protocol layer entity of a core network element configures a third sequence number SN of a splitting protocol layer in a third splitting protocol layer data packet, and configures a fourth SN of the splitting protocol layer in a fourth splitting protocol layer data packet may include: The splitting protocol layer entity of the core network element may configure the third SN of the splitting protocol layer in the third splitting protocol layer data packet and configure the fourth SN of the splitting protocol layer in the fourth splitting protocol layer data packet based on the SN information.

In other words, the splitting protocol layer entity of the core network element may configure different SNs of the splitting protocol layer in different data packets at the splitting protocol layer based on the SN information, so that a receiver reorders the data packets based on the SNs in the data packets, to sequentially deliver the data packets to an upper layer.

In a possible solution, that the splitting protocol layer entity of the core network element sends the third splitting protocol layer data packet to a first protocol layer entity corresponding to a first access network device, and sends the fourth splitting protocol layer data packet to a first protocol layer entity corresponding to a second access network device may include:

When the first splitting indication information has a first value and an amount of data to be sent by the splitting protocol layer entity of the core network element is greater than or equal to the first threshold, the splitting protocol layer entity of the core network element may send the third splitting protocol layer data packet to the first protocol layer entity corresponding to the first access network device, and send the fourth splitting protocol layer data packet to the first protocol layer entity corresponding to the second access network device.

In this way, when the splitting protocol layer entity is configured to enable a splitting function, and an amount of to-be-sent data is greater than or equal to the threshold, the core network element transmits data packets to the first access network device and the second access network device through Uu interfaces, to send the data packets to the terminal device in splitting mode. In addition, data can be prevented from being forwarded through an Xn interface, to reduce a delay in a data transmission process, thereby meeting a high rate requirement and a low delay requirement of data transmission.

In a possible solution, the communication method according to the fourth aspect may further include: The core network element may send a first message. The first message may include the first configuration information, and the first message may indicate the terminal device to determine the splitting protocol layer based on the configuration information.

In addition, for an effect of the communication method in the fourth aspect, refer to the effect of the communication method in any implementation of the third aspect. Details are not described herein again.

According to a fifth aspect, a communication method is provided. The communication method includes: A sequence protocol layer entity of the terminal device configures, based on first allocation information, a first sequence number (SN) of a sequence protocol layer in a first sequence protocol layer data packet, and configures a second SN of the sequence protocol layer in a second sequence protocol layer data packet; and the sequence protocol layer entity of the terminal device sends the first sequence protocol layer data packet to a second protocol layer entity corresponding to a first access network device, and sends the second sequence protocol layer data packet to a second protocol layer entity corresponding to a second access network device. The first allocation information indicates allocation rules of SNs of sequence protocol layers corresponding to the first access network device and the second access network device respectively.

Based on the communication method according to the fifth aspect, the sequence protocol layer entity of the terminal device separately sends different data packets to the second protocol layer entity corresponding to the first access network device and the second protocol layer entity corresponding to the second access network device. In this way, the terminal device transmits the data packets to the first access network device and the second access network device through Uu interfaces, to send the data packets to a core network element in splitting mode, thereby improving a data transmission rate. In addition, data can be prevented from being forwarded through an Xn interface, to reduce a delay in a data transmission process, thereby meeting a high rate requirement and a low delay requirement of data transmission.

In addition, the terminal device allocates different SNs of sequence protocol layers to different data packets based on the first allocation information. An access network device receives the data packets, and allocates different SNs of rule protocol layers to the different data packets based on second allocation information. In this way, the core network element receives the data packets and reorders the data packets based on the SNs, so that the data packets can be sequentially delivered to an upper layer.

It should be noted that the second protocol layer entity corresponding to the first access network device and the second protocol layer entity corresponding to the second access network device are both on a terminal device side.

In a possible solution, the first allocation information may include a first allocation rule and a second allocation rule. The first allocation rule may be an allocation rule corresponding to the first access network device, and the second allocation rule may be an allocation rule corresponding to the second access network device. This can ensure that SNs of sequence protocol layers corresponding to the first access network device and the second access network device respectively are different.

In a possible solution, the first allocation rule may be obtaining at least one first SN value based on a first initial value and/or a first superimposition value, where the first superimposition value may be an interval between two adjacent first SN values. The second allocation rule may be obtaining at least one second SN value based on a second initial value and/or a second superimposition value, where the second superimposition value may be an interval between two adjacent second SN values. The first initial value is different from the second initial value. In other words, the first SN value and the second SN value may be determined according to an allocation rule, provided that the first SN value is different from the second SN value.

In another possible solution, the first allocation rule may indicate a value range of an SN of a sequence protocol layer corresponding to the first access network device, and the second allocation rule may indicate a value range of an SN of a sequence protocol layer corresponding to the second access network device. In other words, the first SN value and the second SN value may be determined by specifying a value range of an SN corresponding to each of the first access network device and the second access network device.

In a possible solution, the communication method according to the fifth aspect may further include: The terminal device may receive a fourth message from the first access network device. The fourth message may indicate to configure the sequence protocol layer, and the fourth message includes one or more of the following: the first allocation information, mapping information, second splitting indication information, a second threshold, second reordering information, and second reordering window information. In other words, the terminal device may configure the sequence protocol layer based on the message sent by the first access network device.

In a possible solution, the mapping information may indicate a mapping relationship between a second quality of service (QOS) flow and a data radio bearer (DRB). The second splitting indication information may indicate whether a sequence protocol layer entity supports sending different data packets to the second protocol layer entity corresponding to the first access network device and the second protocol layer entity corresponding to the second access network device. The second threshold may indicate an amount threshold of to-be-sent data.

In other words, the second splitting indication information may indicate whether the sequence protocol layer entity supports sending of data packets in splitting mode, and the second threshold may indicate an amount threshold of data for data splitting performed by the sequence protocol layer entity. When the sequence protocol layer entity supports sending of data packets in splitting mode, and an amount of to-be-sent data is greater than or equal to the second threshold, the sequence protocol layer entity may separately send different data packets to second protocol layer entities corresponding to different access network devices, to improve a data transmission rate.

In a possible solution, the second reordering information may indicate whether to reorder received sequence protocol layer data packets in ascending order of SNs, and the second reordering window information may indicate maximum time for waiting for a lost sequence protocol layer data packet.

In this way, if the second reordering information indicates to reorder received sequence protocol layer data packets in ascending order of SNs, the data packets may be sorted in ascending order of SNs in the sequence protocol layer data packets, to ensure that the data packets are sequentially delivered to an upper layer. When the second reordering information indicates to reorder received sequence protocol layer data packets in ascending order of SNs, and time for the sequence protocol layer entity to wait for a lost sequence protocol layer data packet is greater than or equal to duration indicated by the second reordering window information, the sequence protocol layer entity may first sequentially deliver received data packets to an upper protocol layer, to further improve a data transmission rate.

In a possible solution, that the sequence protocol layer entity of the terminal device sends the first sequence protocol layer data packet to a second protocol layer entity corresponding to a first access network device, and sends the second sequence protocol layer data packet to a second protocol layer entity corresponding to a second access network device may include: The sequence protocol layer entity of the terminal device may send, based on the mapping information, the first sequence protocol layer data packet to the second protocol layer entity corresponding to the first access network device; and the sequence protocol layer entity of the terminal device may send, based on the mapping information, the second sequence protocol layer data packet to the second protocol layer entity corresponding to the second access network device.

In this way, data can be sent to the core network element in splitting mode, a data transmission rate can be improved, and forwarding does not need to be performed through an Xn interface between access network devices, thereby reducing a delay in a data transmission process.

In a possible solution, the sequence protocol layer entity of the terminal device may send the first sequence protocol layer data packet to a second protocol layer entity corresponding to a first access network device and may send the second sequence protocol layer data packet to a second protocol layer entity corresponding to a second access network device. When the second splitting indication information has a first value and an amount of data to be sent by the sequence protocol layer entity of the terminal device is greater than or equal to the second threshold, the sequence protocol layer entity of the terminal device sends the first sequence protocol layer data packet to the second protocol layer entity corresponding to the first access network device, and sends the second sequence protocol layer data packet to the second protocol layer entity corresponding to the second access network device.

In this way, when the sequence protocol layer entity is configured to enable a splitting function, and an amount of to-be-sent data is greater than or equal to the threshold, the terminal device transmits data packets to the first access network device and the second access network device through Uu interfaces, to send the data packets to the core network element in splitting mode. In addition, data can be prevented from being forwarded through an Xn interface, to reduce a delay in a data transmission process, thereby meeting a high rate requirement and a low delay requirement of data transmission.

According to a sixth aspect, a communication method is provided. The communication method includes: A rule protocol layer entity of a core network element receives a first rule protocol layer data packet and a second rule protocol layer data packet; and the rule protocol layer entity of the core network element sends a parsed first rule protocol layer data packet and a parsed second rule protocol layer data packet to an upper protocol layer entity of the rule protocol layer entity in ascending order of SNs in a first SN and a second SN. The first rule protocol layer data packet includes the first sequence number SN of a rule protocol layer, and the second rule protocol layer data packet includes the second SN of the rule protocol layer.

In a possible solution, the communication method according to the sixth aspect may further include: The rule protocol layer entity of the core network element may obtain third reordering information corresponding to a second quality of service (QOS) flow. The second QoS flow may be used to transmit a rule protocol layer data packet, and the third reordering information may indicate whether to reorder received rule protocol layer data packets in ascending order of SNs.

In a possible solution, the communication method according to the sixth aspect may further include: if the third reordering information has a second value, the rule protocol layer entity of the core network element may send the parsed first rule protocol layer data packet and the parsed second rule protocol layer data packet to the upper protocol layer entity of the rule protocol layer entity in ascending order of the SNs in the first SN and the second SN.

That is, when there is a reordering requirement, the rule protocol layer entity of the core network element may sort data packets, to sequentially deliver the data packets to an upper layer.

In a possible solution, the communication method according to the sixth aspect may further include: When the third reordering information has a second value, and time for the rule protocol layer entity of the core network element to wait for a lost rule protocol layer data packet is greater than or equal to third reordering window information, the rule protocol layer entity of the core network element may send received rule protocol layer data packets to the upper protocol layer entity of the rule protocol layer entity in ascending order of SNs. The third reordering window information may indicate maximum time for waiting for the lost rule protocol layer data packet.

That is, when there is a reordering requirement, and time for waiting for a lost rule protocol layer data packet is greater than or equal to duration indicated by the third reordering window information, the rule protocol layer entity of the core network element may first sequentially deliver received data packets to an upper protocol layer, to further improve a data transmission rate.

In a possible solution, the communication method according to the sixth aspect may further include: The core network element may send a second message to a first access network device. The second message may indicate whether to determine first allocation information, and the first allocation information may indicate allocation rules of SNs of sequence protocol layers corresponding to the first access network device and a second access network device respectively.

In other words, the core network element may indicate whether the first access network device exchanges an SN allocation rule with the second access network device, to prevent the first access network device and the second access network device from allocating a same SN to the first rule protocol layer data packet and the second rule protocol layer data packet.

In a possible solution, the second message may include second protocol data unit PDU session information and/or second QoS flow information.

In a possible solution, the second PDU session information may indicate configuration information of a PDU session, and the second PDU session information may include whether a sequence protocol layer entity corresponding to a data radio bearer DRB associated with the PDU session determines the first allocation information with the second access network device. The second QoS flow information may indicate configuration information of a QoS flow, and the second QoS flow information includes whether a sequence protocol layer entity corresponding to a DRB associated with the QoS flow determines the first allocation information with the second access network device. In other words, the core network element may indicate, by using the second PDU session information and/or the second QoS flow information, whether the first access network device negotiates with the second access network device about an SN allocation rule.

In addition, for an effect of the communication method in the sixth aspect, refer to the effect of the communication method in any implementation of the fifth aspect. Details are not described herein again.

According to a seventh aspect, a communication method is provided. The communication method includes: determining first allocation information, and sending a third message to a second access network device. The first allocation information indicates allocation rules of sequence numbers SNs of sequence protocol layers corresponding to a first access network device and a second access network device respectively, and the third message includes the first allocation information.

Based on the communication method according to the seventh aspect, the first access network device may negotiate the first allocation information with the second access network device, to ensure that SNs of the sequence protocol layers corresponding to the first access network device and the second access network device respectively are different. Therefore, when sending data packets, the first access network device and the second access network device may allocate SNs of different sequence protocol layers to the data packets, and a data packet receiver may sort the data packets based on the SNs, so that the data packets can be sequentially delivered to an upper layer.

In a possible solution, the first allocation information may include a first allocation rule and a second allocation rule. The first allocation rule may be an allocation rule corresponding to the first access network device, and the second allocation rule may be an allocation rule corresponding to the second access network device. This can ensure that SNs of sequence protocol layers corresponding to the first access network device and the second access network device respectively are different.

In a possible solution, the first allocation rule may be obtaining at least one first SN value based on a first initial value and/or a first superimposition value, where the first superimposition value may be an interval between two adjacent first SN values. The second allocation rule may be obtaining at least one second SN value based on a second initial value and/or a second superimposition value, where the second superimposition value is an interval between two adjacent second SN values, and the first initial value is different from the second initial value. In other words, the first SN value and the second SN value may be determined according to an allocation rule, provided that the first SN value is different from the second SN value.

In another possible solution, the first allocation rule may indicate a value range of an SN of a sequence protocol layer corresponding to the first access network device, and the second allocation rule may indicate a value range of an SN of a sequence protocol layer corresponding to the second access network device. In other words, the first SN value and the second SN value may be determined by specifying a value range of an SN corresponding to each of the first access network device and the second access network device.

In a possible solution, the communication method according to the seventh aspect may further include: receiving a second message from a core network element. The second message may indicate whether to determine the first allocation information.

In other words, the first access network device may exchange an SN allocation rule with the second access network device based on an indication of the core network element, to prevent the first access network device and the second access network device from allocating a same SN to different data packets.

In a possible solution, the second message may include second protocol data unit PDU session information and/or second quality of service QoS flow information.

In a possible solution, the second PDU session information may indicate configuration information of a PDU session. The second PDU session information may include whether a sequence protocol layer entity corresponding to a data radio bearer (DRB) associated with the PDU session determines the first allocation information with the second access network device. The second QoS flow information may indicate configuration information of a QoS flow, and the second QoS flow information includes whether a sequence protocol layer entity corresponding to a DRB associated with the QoS flow determines the first allocation information with the second access network device. In other words, the first access network device may determine, based on the second PDU session information and/or the second QoS flow information, whether to negotiate with the second access network device about an SN allocation rule.

In a possible solution, the communication method according to the seventh aspect may further include: sending a fourth message to a terminal device. The fourth message may include one or more of the following: the first allocation information, mapping information, second splitting indication information, a second threshold, second reordering information, and second reordering window information. In other words, the first access network device may indicate the terminal device to configure the sequence protocol layer.

In a possible solution, the mapping information may indicate a mapping relationship between a second QoS flow and a data radio bearer (DRB). The second splitting indication information may indicate whether a sequence protocol layer entity supports sending different data packets to the second protocol layer entity corresponding to the first access network device and the second protocol layer entity corresponding to the second access network device. The second threshold may indicate an amount threshold of to-be-sent data.

In other words, the second splitting indication information may indicate whether the sequence protocol layer entity supports sending of data packets in splitting mode, and the second threshold may indicate an amount threshold of data for data splitting performed by the sequence protocol layer entity. When the sequence protocol layer entity supports sending of data packets in splitting mode, and an amount of to-be-sent data is greater than or equal to the second threshold, the sequence protocol layer entity may separately send different data packets to second protocol layer entities corresponding to different access network devices, to improve a data transmission rate.

In a possible solution, the second reordering information may indicate whether to reorder received sequence protocol layer data packets in ascending order of SNs, and the second reordering window information may indicate maximum time for waiting for a lost sequence protocol layer data packet.

In this way, if the second reordering information indicates to reorder received sequence protocol layer data packets in ascending order of SNs, the data packets may be sorted in ascending order of SNs in the sequence protocol layer data packets, to ensure that the data packets are sequentially delivered to an upper layer. When the second reordering information indicates to reorder received sequence protocol layer data packets in ascending order of SNs, and time for the sequence protocol layer entity to wait for a lost sequence protocol layer data packet is greater than or equal to duration indicated by the second reordering window information, the sequence protocol layer entity may first sequentially deliver received data packets to an upper protocol layer, to further improve a data transmission rate.

In a possible solution, the second message may include second allocation information, and the communication method according to the seventh aspect may further include: determining the first allocation information based on the second allocation information. The second allocation information may indicate allocation rules of SNs of rule protocol layers corresponding to the first access network device and the second access network device respectively. In other words, after obtaining the second allocation information from the core network element, the first access network device may determine allocation rules of SNs of sequence protocol layers corresponding to the first access network device and a second access network device respectively.

In a possible solution, the communication method according to the seventh aspect may further include: determining second allocation information based on the first allocation information. The second allocation information may indicate allocation rules of SNs of rule protocol layers corresponding to the first access network device and the second access network device respectively.

This can ensure that the SNs of the rule protocol layers corresponding to the first access network device and the second access network device respectively are different, so that a data receiver may sort data packets based on SNs of rule protocol layers, and may sequentially deliver the data packets to an upper layer.

According to an eighth aspect, a communication method is provided. The communication method includes: A sequence protocol layer entity of a terminal device receives a third sequence protocol layer data packet and a fourth sequence protocol layer data packet from a second protocol layer entity of the terminal device; and the sequence protocol layer entity of the terminal device sends a parsed third sequence protocol layer data packet and a parsed fourth sequence protocol layer data packet to an upper protocol layer entity of the sequence protocol layer entity in ascending order of SNs in a third SN and a fourth SN. The third sequence protocol layer data packet includes the third sequence number SN of a sequence protocol layer, and the fourth sequence protocol layer data packet includes the fourth SN of the sequence protocol layer.

Based on the communication method according to the eighth aspect, the rule protocol layer entity of the core network element separately sends different data packets to a third protocol layer entity corresponding to a first access network device and a third protocol layer entity corresponding to a second access network device. In this way, the core network element transmits the data packets to the first access network device and the second access network device through Uu interfaces, to send the data packets to the terminal device in splitting mode, thereby improving a data transmission rate. In addition, data can be prevented from being forwarded through an Xn interface, to reduce a delay in a data transmission process, thereby meeting a high rate requirement and a low delay requirement of data transmission.

In addition, the core network element allocates different sequence numbers SNs of rule protocol layers to different data packets based on second allocation information. An access network device receives the data packets, and allocates different sequence numbers SNs of sequence protocol layers to the different data packets based on first allocation information. In this way, the terminal device receives the data packets and sorts the data packets based on the SNs, so that the data packets can be sequentially delivered to an upper layer.

In a possible solution, the communication method according to the eighth aspect may further include: The terminal device may receive a fourth message from the first access network device. The fourth message may indicate to configure the sequence protocol layer, and the fourth message includes one or more of the following: the first allocation information, mapping information, second splitting indication information, a second threshold, second reordering information, and second reordering window information. In other words, the terminal device may configure the sequence protocol layer based on the message sent by the first access network device.

In a possible solution, the first allocation information may include a first allocation rule and a second allocation rule. The first allocation rule may be an allocation rule corresponding to the first access network device, and the second allocation rule may be an allocation rule corresponding to the second access network device. This can ensure that SNs of sequence protocol layers corresponding to the first access network device and the second access network device respectively are different.

In a possible solution, the first allocation rule may be obtaining at least one first SN value based on a first initial value and/or a first superimposition value, where the first superimposition value may be an interval between two adjacent first SN values. The second allocation rule may be obtaining at least one second SN value based on a second initial value and/or a second superimposition value, where the second superimposition value is an interval between two adjacent second SN values, and the first initial value is different from the second initial value. In other words, the first SN value and the second SN value may be determined according to an allocation rule, provided that the first SN value is different from the second SN value.

In another possible solution, the first allocation rule may indicate a value range of an SN of a sequence protocol layer corresponding to the first access network device, and the second allocation rule may indicate a value range of an SN of a sequence protocol layer corresponding to the second access network device. In other words, the first SN value and the second SN value may be determined by specifying a value range of an SN corresponding to each of the first access network device and the second access network device.

In a possible solution, the mapping information may indicate a mapping relationship between a second quality of service (QOS) flow and a data radio bearer (DRB), and the second splitting indication information may indicate whether a sequence protocol layer entity supports sending different data packets to a second protocol layer entity corresponding to the first access network device and a second protocol layer entity corresponding to the second access network device. The second threshold may indicate an amount threshold of to-be-sent data.

In other words, the second splitting indication information may indicate whether the sequence protocol layer entity supports sending of data packets in splitting mode, and the second threshold may indicate an amount threshold of data for data splitting performed by the sequence protocol layer entity. When the sequence protocol layer entity supports sending of data packets in splitting mode, and an amount of to-be-sent data is greater than or equal to the second threshold, the sequence protocol layer entity may separately send different data packets to second protocol layer entities corresponding to different access network devices, to improve a data transmission rate.

In a possible solution, the second reordering information may indicate whether to reorder received sequence protocol layer data packets in ascending order of SNs, and the second reordering window information may indicate maximum time for waiting for a lost sequence protocol layer data packet.

In this way, if the second reordering information indicates to reorder received sequence protocol layer data packets in ascending order of SNs, the data packets may be sorted in ascending order of SNs in the sequence protocol layer data packets, to ensure that the data packets are sequentially delivered to an upper layer. When the second reordering information indicates to reorder received sequence protocol layer data packets in ascending order of SNs, and time for the sequence protocol layer entity to wait for a lost sequence protocol layer data packet is greater than or equal to duration indicated by the second reordering window information, the sequence protocol layer entity may first sequentially deliver received data packets to an upper protocol layer, to further improve a data transmission rate.

In a possible solution, the communication method according to the eighth aspect may further include: if the second reordering information has a second value, the sequence protocol layer entity of the terminal device may send the parsed third sequence protocol layer data packet and the parsed fourth sequence protocol layer data packet to the upper protocol layer entity of the sequence protocol layer entity in ascending order of the SNs in the third SN and the fourth SN. In this way, when there is a reordering requirement, the sequence protocol layer entity of the terminal device may sort data packets, to sequentially deliver the data packets to an upper layer.

In a possible solution, the communication method according to the eighth aspect may further include: when the second reordering information has a second value, and time for the sequence protocol layer entity of the terminal device to wait for a lost sequence protocol layer data packet is greater than or equal to the second reordering window information, the sequence protocol layer entity of the terminal device may send received sequence protocol layer data packets to the upper protocol layer entity of the sequence protocol layer entity in ascending order of SNs of the sequence protocol layer.

In this way, when there is a reordering requirement, and time for waiting for a lost sequence protocol layer data packet is greater than or equal to duration indicated by the second reordering window information, the sequence protocol layer entity of the terminal device may first sequentially deliver received data packets to an upper protocol layer, to further improve a data transmission rate.

According to a ninth aspect, a communication method is provided. The communication method includes: A rule protocol layer entity of a core network element configures, based on second allocation information, a third sequence number SN of a rule protocol layer in a third rule protocol layer data packet, and configures a fourth SN of the rule protocol layer in a fourth rule protocol layer data packet; and the rule protocol layer entity of the core network element sends the third rule protocol layer data packet to a third protocol layer entity corresponding to a first access network device, and sends the fourth rule protocol layer data packet to a third protocol layer entity corresponding to a second access network device. The second allocation information indicates allocation rules of SNs of rule protocol layers corresponding to the first access network device and the second access network device respectively.

It should be noted that the third protocol layer entity corresponding to the first access network device and the third protocol layer entity corresponding to the second access network device are both on a core network element side.

In a possible solution, the second allocation information may include a third allocation rule and a fourth allocation rule. The third allocation rule may be an allocation rule corresponding to the first access network device, and the fourth allocation rule may be an allocation rule corresponding to the second access network device. This can ensure that SNs of rule protocol layers corresponding to the first access network device and the second access network device respectively are different.

In a possible solution, the third allocation rule may be obtaining at least one first SN value based on a first initial value and/or a first superimposition value, where the first superimposition value is an interval between two adjacent first SN values. The fourth allocation rule may be obtaining at least one second SN value based on a second initial value and/or a second superimposition value, where the second superimposition value is an interval between two adjacent second SN values, and the first initial value is different from the second initial value. In other words, the first SN value and the second SN value may be determined according to an allocation rule, provided that the first SN value is different from the second SN value.

In another possible solution, the third allocation rule may indicate a value range of the SN of the rule protocol layer corresponding to the first access network device, and the fourth allocation rule may indicate a value range of the SN of the rule protocol layer corresponding to the second access network device. In other words, the first SN value and the second SN value may be determined by specifying a value range of an SN corresponding to each of the first access network device and the second access network device.

In a possible solution, that the rule protocol layer entity of the core network element sends the third rule protocol layer data packet to a third protocol layer entity corresponding to a first access network device, and sends the fourth rule protocol layer data packet to a third protocol layer entity corresponding to a second access network device may include: When third splitting indication information has a first value, and an amount of data to be sent by the rule protocol layer entity of the core network element is greater than or equal to a third threshold, the rule protocol layer entity of the core network element may send the third rule protocol layer data packet to the third protocol layer entity corresponding to the first access network device, and send the fourth rule protocol layer data packet to the third protocol layer entity corresponding to the second access network device.

In this way, when the rule protocol layer entity is configured to enable a splitting function, and an amount of to-be-sent data is greater than or equal to the threshold, the core network element transmits data packets to the first access network device and the second access network device through Uu interfaces, to send the data packets to the terminal device in splitting mode. In addition, data can be prevented from being forwarded through an Xn interface, to reduce a delay in a data transmission process, thereby meeting a high rate requirement and a low delay requirement of data transmission.

In a possible solution, the third splitting indication information may indicate whether a rule protocol layer entity supports sending different data packets to the third protocol layer entity corresponding to the first access network device and the third protocol layer entity corresponding to the second access network device. The third threshold may indicate an amount threshold of to-be-sent data.

In other words, the third splitting indication information may indicate whether the rule protocol layer entity supports sending of data packets in splitting mode, and the third threshold may indicate an amount threshold of data for data splitting performed by the rule protocol layer entity. When the rule protocol layer entity supports sending of data packets in splitting mode, and an amount of to-be-sent data is greater than or equal to the third threshold, the rule protocol layer entity may separately send different data packets to third protocol layer entities corresponding to different access network devices, to improve a data transmission rate.

In a possible solution, the communication method according to the ninth aspect may further include: The core network element may send a second message to a first access network device. The second message may indicate whether to determine first allocation information, and the first allocation information may indicate allocation rules of SNs of sequence protocol layers corresponding to the first access network device and a second access network device respectively. In other words, the core network element may indicate whether the first access network device exchanges an SN allocation rule with the second access network device, to prevent the first access network device and the second access network device from allocating a same SN to different data packets.

In a possible solution, the second message may include second protocol data unit PDU session information and/or second QoS flow information.

In a possible solution, the second PDU session information may indicate configuration information of a PDU session, the second PDU session information may include whether a sequence protocol layer entity corresponding to a data radio bearer DRB associated with the PDU session determines the first allocation information with the second access network device. The second QoS flow information may indicate configuration information of a QoS flow, and the second QoS flow information includes whether a sequence protocol layer entity corresponding to a DRB associated with the QoS flow determines the first allocation information with the second access network device. In other words, the first access network device may determine, based on the second PDU session information and/or the second QoS flow information, whether to negotiate with the second access network device about an SN allocation rule.

In addition, for an effect of the communication method in the ninth aspect, refer to the effect of the communication method in any implementation of the eighth aspect. Details are not described herein again.

According to a tenth aspect, a communication apparatus is provided. The communication apparatus includes a module configured to perform the method according to any one of the first aspect, the third aspect, the fifth aspect, or the eighth aspect.

The communication apparatus according to the tenth aspect may be a terminal device, or a chip (system) or another component or assembly that may be disposed on the terminal device.

In addition, for an effect of the communication apparatus in the tenth aspect, refer to the effect of the communication method in any implementation of the first aspect, the third aspect, the fifth aspect, or the eighth aspect. Details are not described herein again.

According to an eleventh aspect, a communication apparatus is provided. The communication apparatus includes a module configured to perform the method according to the seventh aspect.

The communication apparatus according to the eleventh aspect may be an access network device, or a chip (system) or another component or assembly that may be disposed on the access network device.

In addition, for an effect of the communication apparatus in the eleventh aspect, refer to the effect of the communication method in any implementation of the seventh aspect. Details are not described herein again.

According to a twelfth aspect, a communication apparatus is provided. The communication apparatus includes a module configured to perform the method according to any one of the second aspect, the fourth aspect, the sixth aspect, or the ninth aspect.

The communication apparatus according to the twelfth aspect may be a core network element, or a chip (system) or another component or assembly that may be disposed on the core network element.

In addition, for an effect of the communication apparatus in the twelfth aspect, refer to the effect of the communication method in any implementation of the second aspect, the fourth aspect, the sixth aspect, or the ninth aspect. Details are not described herein again.

According to a thirteenth aspect, a communication apparatus is provided. The communication apparatus includes a processor and a memory. The processor is coupled to the memory, and the processor is configured to control the communication apparatus to implement the method according to any one of the first aspect, the third aspect, the fifth aspect, or the eighth aspect.

The communication apparatus according to the thirteenth aspect may be a terminal device, or a chip (system) or another component or assembly that may be disposed on the terminal device.

In addition, for an effect of the communication apparatus in the thirteenth aspect, refer to the effect of the communication method in any implementation of the first aspect, the third aspect, the fifth aspect, or the eighth aspect. Details are not described herein again.

According to a fourteenth aspect, a communication apparatus is provided. The communication apparatus includes a processor and a memory. The processor is coupled to the memory, and the processor is configured to control the communication apparatus to implement the method according to the seventh aspect.

The communication apparatus according to the fourteenth aspect may be an access network device, or a chip (system) or another component or assembly that may be disposed on the access network device.

In addition, for an effect of the communication apparatus in the fourteenth aspect, refer to the effect of the communication method in any implementation of the seventh aspect. Details are not described herein again.

According to a fifteenth aspect, a communication apparatus is provided. The communication apparatus includes a processor and a memory. The processor is coupled to the memory, and the processor is configured to control the communication apparatus to implement the method according to any one of the second aspect, the fourth aspect, the sixth aspect, or the ninth aspect.

The communication apparatus according to the fifteenth aspect may be a core network element, or a chip (system) or another component or assembly that may be disposed on the core network element.

In addition, for an effect of the communication apparatus in the fifteenth aspect, refer to the effect of the communication method in any implementation of the second aspect, the fourth aspect, the sixth aspect, or the ninth aspect. Details are not described herein again.

According to a sixteenth aspect, a communication apparatus is provided. The communication apparatus includes a processor and an interface circuit. The interface circuit is configured to: receive a signal from another communication apparatus other than the communication apparatus and transmit the signal to the processor or send a signal from the processor to another communication apparatus other than the communication apparatus. The processor is configured to implement the method according to any one of the first aspect, the third aspect, the fifth aspect, or the eighth aspect by using a logic circuit or according to execution code instructions.

The communication apparatus according to the sixteenth aspect may be a terminal device, or a chip (system) or another component or assembly that may be disposed on the terminal device.

In addition, for an effect of the communication apparatus in the sixteenth aspect, refer to the effect of the communication method in any implementation of the first aspect, the third aspect, the fifth aspect, or the eighth aspect. Details are not described herein again.

According to a seventeenth aspect, a communication apparatus is provided. The communication apparatus includes a processor and an interface circuit. The interface circuit is configured to: receive a signal from another communication apparatus other than the communication apparatus and transmit the signal to the processor or send a signal from the processor to another communication apparatus other than the communication apparatus. The processor is configured to implement the method according to the seventh aspect by using a logic circuit or according to execution code instructions.

The communication apparatus according to the seventeenth aspect may be an access network device, or a chip (system) or another component or assembly that may be disposed on the access network device.

In addition, for an effect of the communication apparatus in the seventeenth aspect, refer to the effect of the communication method in any implementation of the seventh aspect. Details are not described herein again.

According to an eighteenth aspect, a communication apparatus is provided. The communication apparatus includes a processor and an interface circuit. The interface circuit is configured to: receive a signal from another communication apparatus other than the communication apparatus and transmit the signal to the processor or send a signal from the processor to another communication apparatus other than the communication apparatus. The processor is configured to implement the method according to any one of the second aspect, the fourth aspect, the sixth aspect, or the ninth aspect by using a logic circuit or according to execution code instructions.

The communication apparatus according to the eighteenth aspect may be a core network element, or a chip (system) or another component or assembly that may be disposed on the core network element.

In addition, for an effect of the communication apparatus in the eighteenth aspect, refer to the effect of the communication method in any implementation of the second aspect, the fourth aspect, the sixth aspect, or the ninth aspect. Details are not described herein again.

According to a nineteenth aspect, a communication system is provided. The system includes one or more terminal devices and a core network element. Optionally, the communication system may further include one or more access network devices.

According to a twentieth aspect, a non-transitory computer-readable storage medium is provided. The non-transitory storage medium stores a computer program or instructions. When the computer program or the instructions are executed by a communication apparatus, the method according to any one of the first aspect, the third aspect, the fifth aspect, or the eighth aspect is implemented.

According to a twenty-first aspect, a non-transitory computer-readable storage medium is provided. The non-transitory storage medium stores a computer program or instructions. When the computer program or the instructions are executed by a communication apparatus, the method according to the seventh aspect is implemented.

According to a twenty-second aspect, a non-transitory computer-readable storage medium is provided. The non-transitory storage medium stores a computer program or instructions. When the computer program or the instructions are executed by a communication apparatus, the method according to any one of the second aspect, the fourth aspect, the sixth aspect, or the ninth aspect is implemented.

According to a twenty-third aspect, a computer program product is provided. The computer program product includes instructions. When the instructions are run, the method according to any one of the first aspect, the third aspect, the fifth aspect, or the eighth aspect is implemented.

According to a twenty-fourth aspect, a computer program product is provided. The computer program product includes instructions. When the instructions are run, the method according to the seventh aspect is implemented.

According to a twenty-fifth aspect, a computer program product is provided. The computer program product includes instructions. When the instructions are run, the method according to any one of the second aspect, the fourth aspect, the sixth aspect, or the ninth aspect is implemented.

DETAILED DESCRIPTION OF THE EMBODIMENTS

The following describes the embodiments with reference to accompanying drawings.

The embodiments may be applied to various communication systems, for example, a wireless fidelity (Wi-Fi) system, a vehicle to everything (V2X) communication system, a device-to-device (D2D) communication system, an internet of vehicles communication system, a 4th generation (4G) mobile communication system such as a long term evolution (LTE) system or a worldwide interoperability for microwave access (WiMAX) communication system, a 5th generation (5G) mobile communication system such as a new radio (NR) system, and/or a future communication system such as a 6th generation (6G) mobile communication system.

All aspects, embodiments, or features are presented by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In the embodiments, the word such as "example" or "for example" is used to represent giving an example, an illustration, or a description. Any embodiment described as an "example" should not be explained as being more preferred or having more advantages than another embodiment. The term "example" is used to present a concept.

A network architecture and a service scenario described in the embodiments are intended to describe the solutions and do not constitute a limitation. With the evolution of the network architecture and the emergence of new service scenarios, the solutions provided in the embodiments are also applicable to similar problems.

Figure 1:
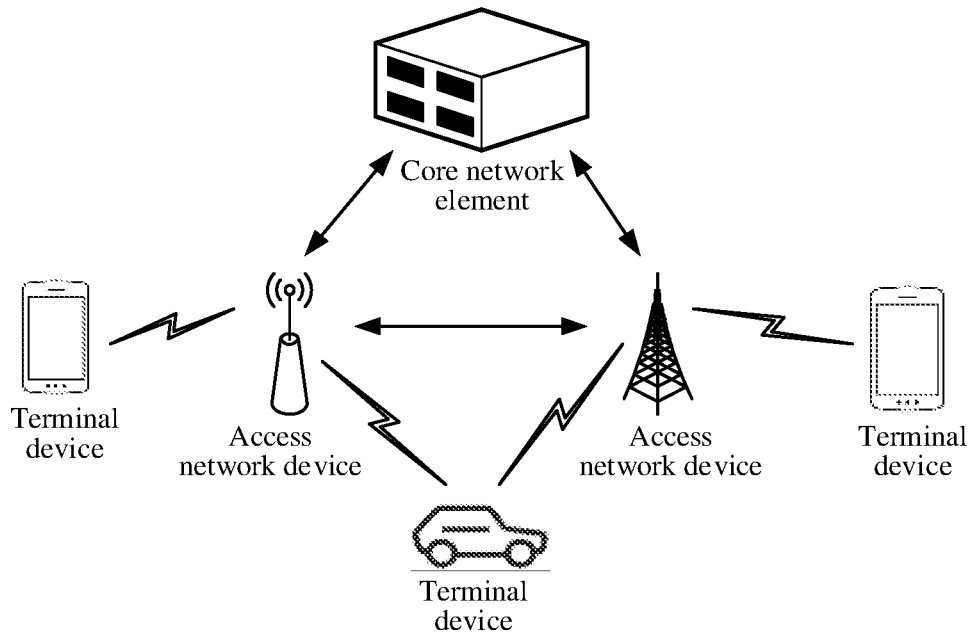
FIG. 1 is a schematic diagram of an architecture of a communication system according to an embodiment.

FIG. 1 is a schematic diagram of an architecture of a communication system to which a communication method provided in the embodiments is applicable. For ease of understanding the embodiments, a communication system shown in FIG. 1 is first used as an example to describe in detail a communication system applicable to the embodiments. It should be noted that the solutions may also be applied to another mobile communication system, and a corresponding name may also be replaced with a name of a corresponding function in the another mobile communication system.

As shown in FIG. 1, the communication system includes a core network element and a terminal device. Optionally, the communication system may further include an access network device.

The core network element is a device that is on a network side of the communication system and that provides a network service for the terminal device through the access network device, or a chip or a chip system that may be disposed on the device. The core network element may also be referred to as a core network device. The core network element in the embodiments may be an access and mobility management function (AMF) entity, a session management function (SMF) entity, a user plane function (UPF) entity, or the like. Details are not listed herein. The AMF entity may be responsible for access management and mobility management of the terminal device. The SMF entity may be responsible for session management, for example, session establishment of the terminal device. The UPF entity may be a function entity on a user plane and may be responsible for a connection to an external network. It should be noted that an entity in the embodiments may also be referred to as a network element or a function entity. For example, the AMF entity may also be referred to as an AMF network element or an AMF function entity. For another example, the SMF entity may also be referred to as an SMF network element or an SMF function entity.

The terminal device in the embodiments may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A technology and a device form that are used by the terminal device are not limited in the embodiments. In the embodiments, an apparatus configured to implement a function of the terminal device may be a terminal device, or may be an apparatus, for example, a chip system that can support the terminal device in implementing the function. The apparatus may be deployed on the terminal device, or may be used together with the terminal device. In the embodiments, the chip system may include a chip, or may include a chip and another discrete component. The solutions provided in the embodiments are described by using an example in which the apparatus configured to implement the function of the terminal device is the terminal device.

The access network device in the embodiments includes, but is not limited to, an access point (AP) (such as a home gateway, a router, a server, a switch, or a bridge) in a wireless fidelity (Wi-Fi) system, a base station, an evolved NodeB (eNB), a radio network controller (RNC), a NodeB (NB), a base station controller (BSC), a base transceiver station (BTS), a home base station such as a home evolved NodeB (HNB), a baseband unit (BBU), a wireless relay node, a wireless backhaul node, a transmission and reception point (TRP)), and the like. Alternatively, the access network device may be a gNB or a transmission point (TP) in 5G, for example, a new radio (NR) system, or one antenna panel or a group of antenna panels (including a plurality of antenna panels) of a base station in the 5G system, or may be a network node that forms a gNB or a transmission point, for example, a baseband unit (BBU), a central unit (CU), a distributed unit (DU), or a road side unit (RSU) having a base station function. The central unit CU may include a central unit-control plane (CU-CP) and a central unit-user plane (CU-UP). The access network device may alternatively be a device including a central unit CU and a distributed unit DU.

It should be noted that the communication method provided in the embodiments may be applied to or assist in communication between any two nodes shown in FIG. 1, for example, between the terminal device and the core network element, between the terminal device and the access network device, or between the access network device and the core network element.

It should be understood that FIG. 1 is merely a simplified schematic diagram of an example for ease of understanding. The communication system may further include another network device and/or another terminal device that are/is not shown in FIG. 1.

For ease of understanding, the following may describe a QoS flow, a PDU session, and a DRB in the embodiments.

Figure 2:
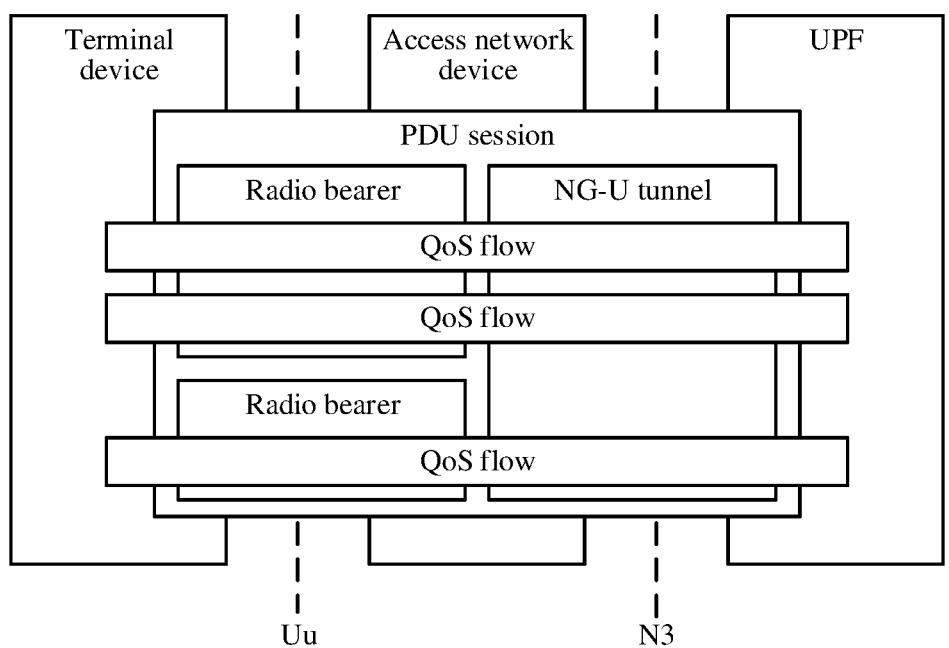
FIG. 2 is a schematic diagram of a QoS architecture according to an embodiment.

FIG. 2 is a schematic diagram of a QoS architecture according to an embodiment. A terminal device may be any terminal device shown in FIG. 1, an access network device may be any access network device shown in FIG. 1, and a core network element may be the core network element shown in FIG. 1, where a UPF is used as an example.

With reference to FIG. 2, one PDU session may include one NG-U tunnel, and the NG-U tunnel is a channel connecting the access network device and the core network element. One PDU session may include a plurality of QoS flows, QFIs of the QoS flows are different, and QFIs corresponding to QoS flows included in different PDU sessions may be the same. The QoS flow is mapped to a radio bearer (RB), where the RB includes a signaling radio bearer (SRB) and a DRB, the SRB is for carrying a message, and the DRB is for carrying user plane data. Mapping between QoS flows and radio bearers (RBs) may be a one-to-one relationship or a many-to-one relationship.

The following describes in detail a protocol architecture provided in the embodiments.

Figure 3:
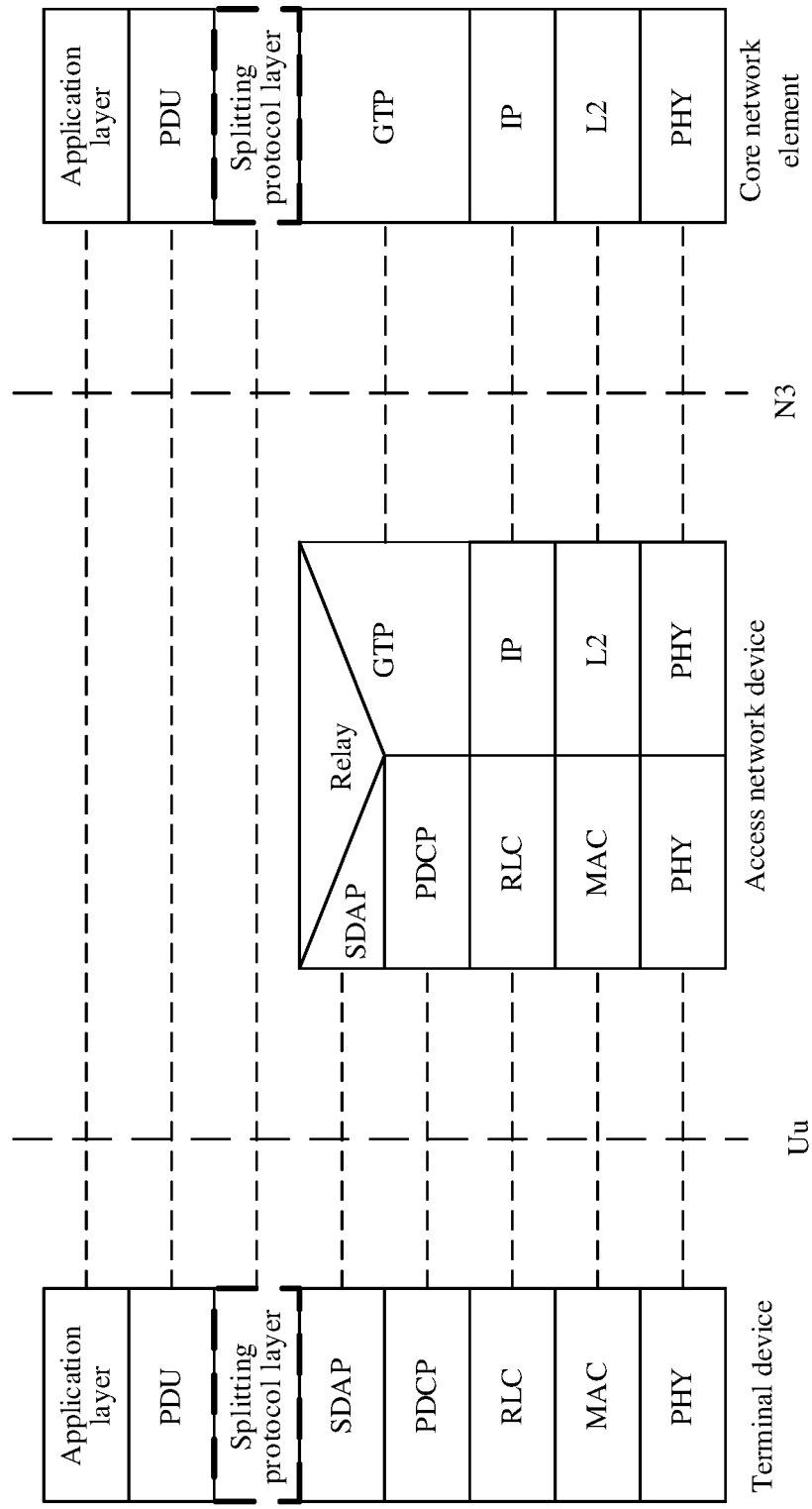
FIG. 3 is a diagram of a protocol architecture according to an embodiment.

FIG. 3 is a diagram of a protocol architecture according to an embodiment. A core network element may be the core network element shown in FIG. 1, a terminal device may be any terminal device shown in FIG. 1, and an access network device may be any access network device shown in FIG. 1. The terminal device may communicate with the access network device through a Uu interface, and the access network device may communicate with the core network element through an N3 interface.

As shown in FIG. 3, in a top-to-bottom order, both the core network element and the terminal device include an application layer, a protocol data unit (PDU) protocol layer, and a splitting protocol layer. Both the core network element and the access network device include a general packet radio service tunneling protocol (GTP) layer, an Internet Protocol (IP) layer, a layer 2 (L2), and a physical (PHY) layer. The GTP protocol layer may be a GTP user plane protocol layer, that is, a GTP-U protocol layer. The layer 2 is a data link layer between the Internet Protocol layer and the physical layer. Both the access network device and the terminal device include a service data adaptation protocol (SDAP) layer, a packet data convergence protocol (PDCP) layer, a radio link control (RLC) protocol layer, a media access control (MAC) protocol layer, and an L1 protocol layer. The access network device further includes a relay layer, and may be for parsing a received data packet, addressing a corresponding SDAP protocol layer entity or GTP protocol layer entity, and sending the data packet.

It should be noted that FIG. 3 is merely an example of a diagram of a protocol architecture according to an embodiment, and the diagram of the protocol architecture may further include another protocol layer. The splitting protocol layer of the core network element may be a protocol layer above the GTP protocol layer of the core network element, and the splitting protocol layer of the terminal device may be a protocol layer above the SDAP protocol layer of the terminal device. The splitting protocol layer may be a configured existing protocol layer. For example, the splitting protocol layer of the core network element may be a PDU protocol layer, an application layer, or the like, and the splitting protocol layer of the terminal device may be a PDU protocol layer, an application layer, or the like. Alternatively, the splitting protocol layer may be a newly created or established protocol layer. For example, the splitting protocol layer of the core network element may be an upper protocol layer (shown in FIG. 3) of the GTP protocol layer or an upper protocol layer of the PDU protocol layer, and the splitting protocol layer of the terminal device may be an upper protocol layer (shown in FIG. 3) of the SDAP protocol layer or an upper protocol layer of the PDU protocol layer.

Protocol layers that have a same name and that are of the core network element and the access network device, of the access network device and the terminal device, or of the core network element and the terminal device may be referred to as peer protocol layers or corresponding protocol layers. For example, the GTP layer of the core network element and the GTP layer of the access network device are a pair of peer protocol layers, the SDAP protocol layer of the access network device and the SDAP protocol layer of the terminal device are a pair of peer protocol layers, and the splitting protocol layer of the core network element and the splitting protocol layer of the terminal device are a pair of peer protocol layers. A peer protocol layer of a sender is configured to generate and send data, and a peer protocol layer of a receiver is configured to receive and parse the data sent by the sender.

Figure 4:
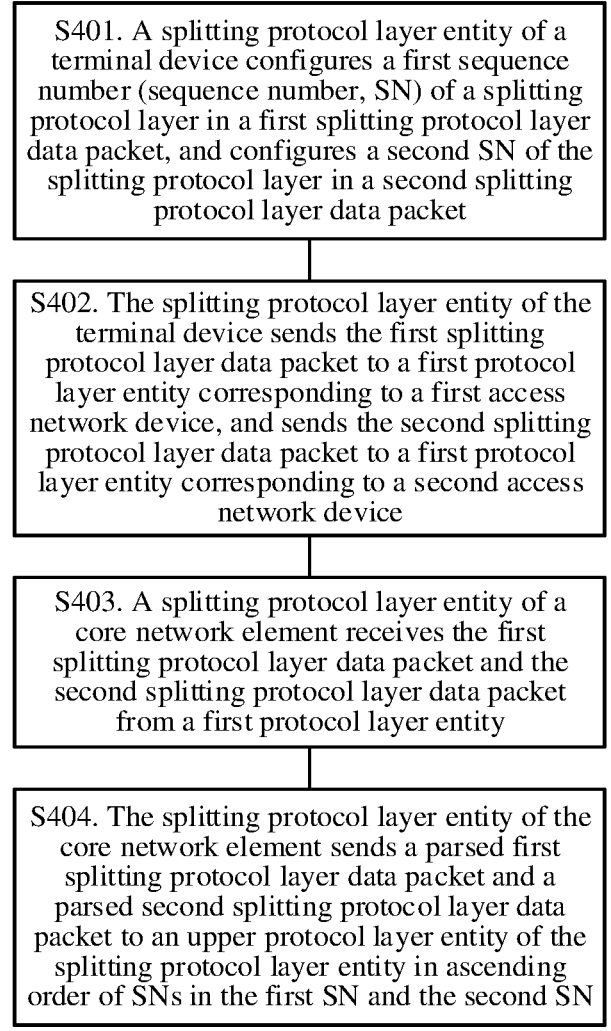
FIG. 4 is a first schematic flowchart of a communication method according to an embodiment.

FIG. 4 is a first schematic flowchart of a communication method according to an embodiment. FIG. 4 is described by using an example in which a terminal device serves as a data sender and a core network element serves as a data receiver. The communication method is applicable to communication between any two nodes shown in FIG. 1.

As shown in FIG. 4, the communication method includes the following steps.

S401. A splitting protocol layer entity of the terminal device configures a first sequence number (SN) of a splitting protocol layer in a first splitting protocol layer data packet and configures a second SN of the splitting protocol layer in a second splitting protocol layer data packet.

For example, it is assumed that a data packet 1 and a data packet 2 are sequentially transferred to the splitting protocol layer entity. SN=1 may be configured in a header of the data packet 1. To ensure that the SNs are sequentially superimposed, SN=2 is configured in a header of the data packet 2.

It should be noted that in this embodiment, an example in which SNs are allocated to sequentially received data packets in ascending order of SNs is used for description. A manner of allocating an SN to a data packet is not limited. For example, SNs may be allocated to sequentially received data packets in descending order of SNs, so that a receiver of the data packets can sort the data packets.

It should be noted that the first splitting protocol layer data packet and the second splitting protocol layer data packet are data packets sent by the terminal device serving as the data sender. The first splitting protocol layer data packet may be referred to as a first data packet of the splitting protocol layer, and the second splitting protocol layer data packet may be referred to as a second data packet of the splitting protocol layer. The first data packet is different from the second data packet. The first data packet may include one or more data packets, and the second data packet may include one or more data packets. The first SN corresponds to the first splitting protocol layer data packet, the first SN may include one or more SNs, the second SN corresponds to the second splitting protocol layer data packet, and the second SN may include one or more SNs.

With reference to FIG. 3, the splitting protocol layer may be a protocol layer above an SDAP layer.

In some embodiments, the splitting protocol layer may be determined based on first configuration information. The terminal device may create or configure the splitting protocol layer based on the first configuration information.

For example, the terminal device may create a protocol layer, which is referred to as the splitting protocol layer, based on the first configuration information. A name of the newly created protocol layer is not limited. Alternatively, the terminal device may configure an existing protocol layer, for example, a PDU protocol layer, based on the first configuration information, and the configured PDU protocol layer may be used as the splitting protocol layer.

In some embodiments, the first configuration information may include first splitting indication information and/or a first threshold.

The first splitting indication information may indicate whether a splitting protocol layer entity supports sending different data packets to a first protocol layer entity corresponding to a first access network device and a first protocol layer entity corresponding to a second access network device. In other words, the first splitting indication information may indicate whether the splitting protocol layer entity supports a splitting function.

For example, a first protocol layer may be a lower protocol layer of the splitting protocol layer. The diagram of the protocol architecture shown in FIG. 3 is used as an example. A lower protocol layer of the splitting protocol layer of the terminal device is the SDAP protocol layer, and the first protocol layer may be the SDAP protocol layer. One or more SDAP protocol layer entities may be created at the SDAP protocol layer. It is assumed that a first SDAP protocol layer entity and a second SDAP protocol layer entity are created at the SDAP protocol layer, the first SDAP protocol layer entity corresponds to the first access network device, and the second SDAP protocol layer entity corresponds to the second access network device. In this case, the splitting protocol layer entity may send a data packet 0, a data packet 1, and a data packet 2 to the first SDAP protocol layer entity, and send a data packet 3 and a data packet 4 to the second SDAP protocol layer entity.

The first threshold may indicate an amount threshold of to-be-sent data. In other words, the first threshold may indicate an amount threshold of data for data splitting performed by the splitting protocol layer entity.

For example, if an amount of the to-be-sent data is greater than or equal to the first threshold, the splitting protocol layer entity separately sends different data packets to first protocol layer entities corresponding to different access network devices, to improve a data transmission rate. Otherwise, the splitting protocol layer entity sends a data packet to a first protocol layer entity corresponding to an access network device. The access network device may be a master access network device or a secondary access network device, or may be preconfigured. This is not limited in this embodiment.

In some embodiments, the first configuration information may include one or more of the following: a splitting protocol layer entity identifier, SN information, first reordering information, first reordering window information, first quality of service (QOS) flow information, first PDU session information, and first DRB information.

For example, the splitting protocol layer entity identifier may indicate the splitting protocol layer entity.

For example, the SN information may indicate a length of an SN. In other words, the SN information may indicate a maximum length of an SN of the splitting protocol layer. For example, the maximum length of the SN is 5. For another example, the maximum length of the SN is 12.

For example, the first reordering information may indicate whether to reorder received splitting protocol layer data packets in ascending order of SNs. If the first reordering information indicates yes, after the splitting protocol layer data packets are received, the data packets are sorted in ascending order of SNs in the splitting protocol layer data packets, to meet a requirement of sequentially delivering the data packets. Otherwise, the received splitting protocol layer data packets may not be reordered.

For example, the first reordering window information may indicate maximum time for waiting for a lost splitting protocol layer data packet.

For example, if a splitting protocol layer data packet whose SN is 0 and a splitting protocol layer data packet whose SN is 2 are received, but a splitting protocol layer data packet whose SN is 1 is not received, the splitting protocol layer data packet whose SN is 1 may be referred to as a lost splitting protocol layer data packet. The first reordering window information may be maximum time for waiting for the splitting protocol layer data packet whose SN is 1.

If the time for waiting for the splitting protocol layer data packet whose SN is 1 is greater than the first reordering window information (for example, 2 milliseconds), and the data packet has not been received, the splitting protocol layer data packet whose SN is 0 and the splitting protocol layer data packet whose SN is 2 may be directly delivered to an upper protocol layer entity of the splitting protocol layer in ascending order of SNs, to improve a data transmission rate.

For example, the first QoS flow information may indicate a QoS flow identifier (QFI) corresponding to the splitting protocol layer entity. Service requirements corresponding to different QoS flows may be different, data corresponding to different QoS flows may need to be processed differently, and functions of different splitting protocol layer entities may be different. Differentiated processing may be performed on the data corresponding to the different QoS flows by using the first QoS flow information.

For example, if the first QoS flow information indicates that a QFI associated with a first splitting protocol layer entity is 5 and a QFI associated with a second splitting protocol layer entity is 6, a data packet whose QFI is 5 is processed by the first splitting protocol layer entity, and a data packet whose QFI is 6 is processed by the second splitting protocol layer entity.

For example, the first PDU session information may indicate a PDU session identifier corresponding to the splitting protocol layer entity. Service requirements corresponding to different PDU sessions may be different, data corresponding to different PDU sessions may need to be processed differently, and functions of different splitting protocol layer entities may be different. Differentiated processing may be performed on the data corresponding to the different PDU sessions by using the first PDU session information.

For example, if the first PDU session information indicates that a PDU session identifier associated with a first splitting protocol layer entity is 2 and a PDU session identifier associated with a second splitting protocol layer entity is 3, a data packet whose PDU session identifier is 2 or a data packet of an SDAP protocol layer (it is assumed that the SDAP protocol layer is a lower protocol layer of the splitting protocol layer) associated with the PDU session identifier 2 is processed by the first splitting protocol layer entity, and a data packet whose PDU session identifier is 3 or a data packet of an SDAP protocol layer (it is assumed that the SDAP protocol layer is a lower protocol layer of the splitting protocol layer) associated with the PDU session identifier 3 is processed by the second splitting protocol layer entity.

For example, the first DRB information may indicate a DRB identifier corresponding to the splitting protocol layer entity. Service requirements corresponding to different DRBs may be different, data corresponding to different DRBs may need to be processed differently, and functions of different splitting protocol layer entities may be different. Differentiated processing may be performed on the data corresponding to the different DRBs by using the first DRB information.

For example, if the first DRB information indicates that a DRB identifier associated with a first splitting protocol layer entity is 2 and a DRB identifier associated with a second splitting protocol layer entity is 3, a data packet whose DRB identifier is 2 or a data packet associated with a DRB whose DRB identifier is 2 is processed by the first splitting protocol layer entity, and a data packet whose DRB identifier is 3 or a data packet associated with a DRB whose DRB identifier is 3 is processed by the second splitting protocol layer entity.

In a possible solution, S401 may include: The splitting protocol layer entity of the terminal device may configure the first SN of the splitting protocol layer in the first splitting protocol layer data packet and configure the second SN of the splitting protocol layer in the second splitting protocol layer data packet based on the SN information. In other words, the splitting protocol layer entity of the terminal device may configure different SNs of the splitting protocol layer in different data packets at the splitting protocol layer based on the SN information, so that a receiver reorders the data packets based on the SNs in the data packets, to sequentially deliver the data packets.

For example, it is assumed that the SN information indicates that the length of the SN of the splitting protocol layer is 5, and the splitting protocol layer of the terminal device may sequentially allocate SN=0, SN=1, SN=2, SN=3, and SN=4 to data packets from an upper layer. After SN=4 is allocated to a data packet, if there are still other data packets to which no SN is allocated, SNs may be sequentially allocated to the other data packets starting from SN=0.

In some embodiments, the communication method provided in this embodiment may further include: The core network element generates the first configuration information.

In some embodiments, the communication method provided in this embodiment may further include: The core network element sends a first message. Correspondingly, a radio access network device receives the first message.

In some embodiments, the communication method provided in this embodiment may further include: The access network element sends the first message. Correspondingly, the terminal device receives the first message. Optionally, the first message may include the first configuration information, and the first message may indicate the terminal device to determine the splitting protocol layer based on the first configuration information. For example, the first message may be a non-access stratum (NAS) message, for example, a registration accept message or a PDU session establishment accept (PDU session establishment accept) message. This is not limited.

S402. The splitting protocol layer entity of the terminal device sends the first splitting protocol layer data packet to the first protocol layer entity corresponding to the first access network device and sends the second splitting protocol layer data packet to the first protocol layer entity corresponding to the second access network device.

It should be noted that, in S402, the first protocol layer entity corresponding to the first access network device and the first protocol layer entity corresponding to the second access network device are both on a terminal device side.

With reference to FIG. 4, it is assumed that an SDAP protocol layer of the terminal device is a first protocol layer, the first SDAP protocol layer entity corresponds to the first access network device, and the second SDAP protocol layer entity corresponds to the second access network device. In this case, the splitting protocol layer entity of the terminal device may send a data packet 0, a data packet 1, and a data packet 2 of the splitting protocol layer to the first SDAP protocol layer entity, and send a data packet 3, a data packet 4, and a data packet 5 of the splitting protocol layer to the second SDAP protocol layer entity.

In a possible solution, S402 may include: When the first splitting indication information has a first value and an amount of data to be sent by the splitting protocol layer entity of the terminal device is greater than or equal to the first threshold, the splitting protocol layer entity of the terminal device may send the first splitting protocol layer data packet to the first protocol layer entity corresponding to the first access network device, and send the second splitting protocol layer data packet to the first protocol layer entity corresponding to the second access network device. Optionally, the first threshold is preset. The first value may be "1" or "True".

In this manner, the terminal device may send different data packets to different access network devices through Uu interfaces, to send the data packets to the core network element in splitting mode, so that a data transmission rate can be improved. Forwarding does not need to be performed through an Xn interface between access network devices, to reduce a delay in a data transmission process.

In a possible solution, S402 may include: The splitting protocol layer entity of the terminal device sends, based on the first QoS flow information, the first splitting protocol layer data packet to the first protocol layer entity corresponding to the first access network device; and the splitting protocol layer entity of the terminal device sends, based on the first QoS flow information, the second splitting protocol layer data packet to the first protocol layer entity corresponding to the second access network device.

For example, if the first QoS flow information indicates that the QFI associated with the first splitting protocol layer entity is 5 and the QFI associated with the second splitting protocol layer entity is 6, after being processed by the first splitting protocol layer entity, the data packet whose QFI is 5 is delivered to an associated lower protocol layer entity, for example, the first protocol layer entity corresponding to the first access network device. After being processed by the second splitting protocol layer entity, the data packet whose QFI is 6 is delivered to an associated lower protocol layer entity, for example, the first protocol layer entity corresponding to the second access network device. Functions of different first protocol layer entities may be different, so that differentiated processing can be performed on data.

In another possible solution, S402 may include: The splitting protocol layer entity of the terminal device sends, based on the first PDU session information, the first splitting protocol layer data packet to the first protocol layer entity corresponding to the first access network device; and the splitting protocol layer entity of the terminal device sends, based on the first PDU session information, the second splitting protocol layer data packet to the first protocol layer entity corresponding to the second access network device.

In still another possible solution, S402 may include: The splitting protocol layer entity of the terminal device sends, based on the first DRB information, the first splitting protocol layer data packet to the first protocol layer entity corresponding to the first access network device; and the splitting protocol layer entity of the terminal device sends, based on the first DRB information, the second splitting protocol layer data packet to the first protocol layer entity corresponding to the second access network device.

A person skilled in the art should understand that examples of the foregoing two possible solutions are similar to the foregoing example in which the splitting protocol layer entity of the terminal device sends the splitting protocol layer data packets to a first protocol layer entity of the terminal device based on the first QoS flow information. Details are not described herein again. In some embodiments, after a splitting protocol layer data packet is processed layer by layer by the splitting protocol layer entity to an L1 protocol layer entity, the splitting protocol layer data packet is sent to the corresponding first access network device or second access network device through a Uu interface, and then the first access network device or the second access network device sends the splitting protocol layer data packet to the core network element. Correspondingly, the core network element receives the data packet, parses the data packet layer by layer from an L1 protocol layer entity to a first protocol layer entity, and performs the following S403 and S404.

S403. A splitting protocol layer entity of the core network element receives the first splitting protocol layer data packet and the second splitting protocol layer data packet from the first protocol layer entity. Correspondingly, the first protocol layer entity of the core network element sends the first splitting protocol layer data packet and the second splitting protocol layer data packet to the splitting protocol layer entity of the core network element.

With reference to FIG. 4, that a first protocol layer of the core network element is a GTP protocol layer is used as an example. After receiving the data packet from the first access network device and the data packet from the second access network device, the core network element parses the received data packets layer by layer from the L1 protocol layer entity to a GTP protocol layer entity to obtain a first splitting protocol layer data packet and a second splitting protocol layer data packet, and transfers the data packets to the splitting protocol layer entity.

S404. The splitting protocol layer entity of the core network element sends the parsed first splitting protocol layer data packet and the parsed second splitting protocol layer data packet to an upper protocol layer entity of the splitting protocol layer entity in ascending order of SNs in the first SN and the second SN.

For example, an upper protocol layer of a splitting protocol layer of the core network element is a PDU protocol layer. It is assumed that the first splitting protocol layer data packet includes a data packet 0, a data packet 1, a data packet 2, and sequence numbers corresponding to the data packet 0, the data packet 1, and the data packet 2 are SN=0, SN=1, and SN=2 respectively, the second splitting protocol layer data packet includes a data packet 3 and a data packet 4, and sequence numbers corresponding to the data packet 3 and the data packet 4 are SN=3 and SN=4 respectively. The core network element may parse the foregoing data packets, and parsed data packets 0, 1, 2, 3, and 4 may be a data packet 0-1, a data packet 1-1, a data packet 2-1, a data packet 3-1, and a data packet 4-1 respectively. The core network element may sort the data packets in ascending order of the SNs, for example, the data packet 0-1, the data packet 1-1, the data packet 2-1, the data packet 3-1, and the data packet 4-1, and transfer the data packets to a PDU protocol layer entity.

It should be noted that a manner of sorting the data packets by the core network element is not limited in this embodiment. The manner may be the same as a manner in which a data packet sender allocates an SN to a data packet.

In a possible solution, the splitting protocol layer entity of the core network element may obtain first reordering information corresponding to a first QoS flow.

For example, the first QoS flow may be for transmitting a splitting protocol layer data packet.

For example, a QoS parameter corresponding to the first QoS flow may include the first reordering information corresponding to the first QoS flow. For example, the QoS parameter corresponding to the first QoS flow may include in-order delivery of data packets, out-of-order delivery of data packets, or not including in-order delivery of data packets.

Out-of-order delivery of data packets may be described as transferring data packets to an upper protocol layer entity in a sequence of receiving the data packets. For example, a sequence of receiving data packets is: a data packet 0, a data packet 2, a data packet 4, a data packet 3, and a data packet 1. The data packets are not sorted and are directly transferred to an upper protocol layer entity, where a transfer sequence is: the data packet 0, the data packet 2, the data packet 4, the data packet 3, and the data packet 1.

In other words, the core network element may obtain the first reordering information from the QoS parameter corresponding to the first QoS flow. When the QoS parameter corresponding to the first QoS flow includes in-order delivery of data packets, it indicates that received data packets need to be sorted. When the QoS parameter corresponding to the first QoS flow does not include in-order delivery of data packets or includes out-of-order delivery of data packets, it indicates that received data packets do not need to be sorted.

In some embodiments, if the first reordering information has a second value, the splitting protocol layer entity of the core network element may send the parsed first splitting protocol layer data packet and the parsed second splitting protocol layer data packet to the upper protocol layer entity of the splitting protocol layer entity in ascending order of the SNs in the first SN and the second SN.

For example, the second value may indicate to reorder received data packets in ascending order of SNs. For example, the second value may be binary "1", or may indicate another manner of reordering received data packets in ascending order of SNs.

For example, when the QoS parameter corresponding to the first QoS flow includes sequentially delivered data packets, the core network element may sort the received data packets in ascending order of SNs, for example, a data packet 0, a data packet 1, a data packet 2, a data packet 3, and a data packet 4, and transfer the data packets to an upper protocol layer entity (for example, the PDU protocol layer entity).

In other words, the core network element may obtain whether there is a requirement for sequentially delivering data packets for the first QoS flow. If there is a requirement for sequentially delivering data packets for the first QoS flow, the core network element sorts the received data packets in ascending order of SNs, and transfers the data packets to an upper protocol layer entity, to meet the requirement for sequentially delivering data packets.

In some embodiments, when first reordering information has a second value, and time for the splitting protocol layer entity of the core network element to wait for a lost splitting protocol layer data packet is greater than or equal to first reordering window information, the splitting protocol layer entity of the core network element may send received splitting protocol layer data packets to the upper protocol layer entity of the splitting protocol layer entity in ascending order of SNs.

For example, if the splitting protocol layer entity of the core network element has received a data packet 0 whose SN is 0 and a data packet 2 whose SN is 2, but has not received a data packet 1 whose SN is 1, the splitting protocol layer entity may wait for the data packet 1. If time for waiting for the data packet 1 is greater than the first reordering window information (for example, 2 milliseconds), and the data packet 1 has not been received, the data packet 0 and the data packet 2 may be directly delivered to the upper protocol layer entity of the splitting protocol layer in ascending order of SNs, to improve a data transmission rate.

Optionally, the splitting protocol layer entity of the core network element receives the lost splitting protocol layer data packet, and sends the lost splitting protocol layer data packet to the upper protocol layer entity of the splitting protocol layer entity.

In other words, after transferring the received splitting protocol layer data packet to the upper protocol layer entity of the splitting protocol layer entity, the splitting protocol layer entity of the core network element receives the lost splitting protocol layer data packet, and may transfer the lost splitting protocol layer data packet to the upper protocol layer entity of the splitting protocol layer entity, to complete data transmission.

It should be noted that the lost splitting protocol layer data packet may include one or more data packets. When the lost splitting protocol layer data packet includes a plurality of data packets, the data packets may be sorted in ascending order of SNs, or may not be sorted. This is not limited in this embodiment.

Based on the communication method shown in FIG. 4, the splitting protocol layer entity of the terminal device separately sends different data packets to the first protocol layer entity corresponding to the first access network device and the first protocol layer entity corresponding to the second access network device. In this way, the terminal device transmits the data packets to the first access network device and the second access network device through Uu interfaces, to send the data packets to the core network element in splitting mode, thereby improving a data transmission rate. In addition, data can be prevented from being forwarded through an Xn interface, to reduce a delay in a data transmission process, thereby meeting a high rate requirement and a low delay requirement of data transmission. In addition, the terminal device allocates different sequence numbers SNs of splitting protocol layers to different data packets, so that the core network element receives the data packets, and may sort the data packets based on the SNs, thereby sequentially delivering the data packets to an upper layer.

Figure 5:
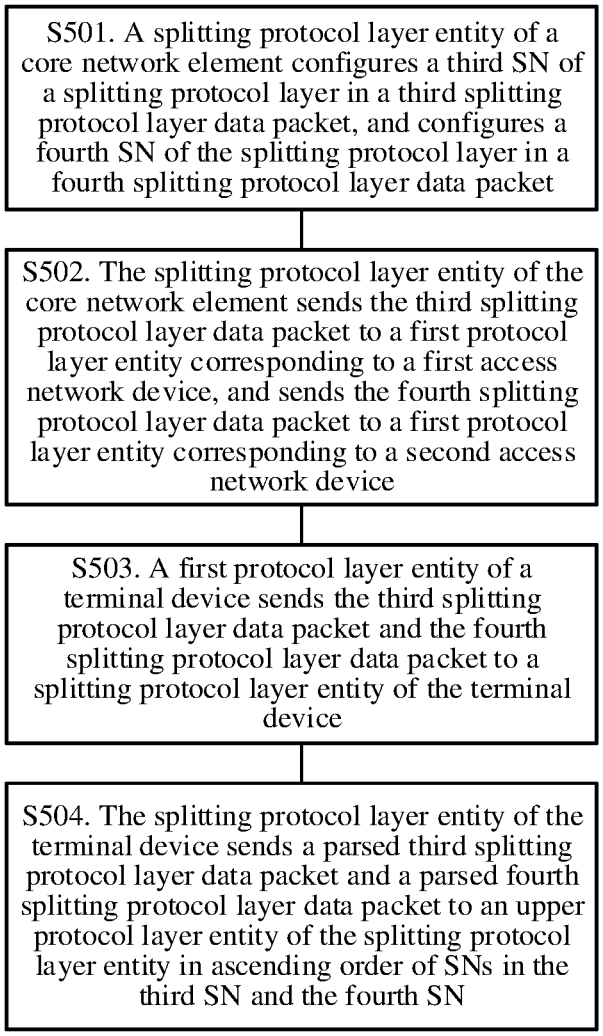
FIG. 5 is a second schematic flowchart of a communication method according to an embodiment.

FIG. 5 is a second schematic flowchart of a communication method according to an embodiment. FIG. 5 is described by using an example in which a core network element serves as a data sender and a terminal device serves as a data receiver. The communication method is applicable to communication between any two nodes shown in FIG. 1.

As shown in FIG. 5, the communication method includes the following steps.

S501. A splitting protocol layer entity of the core network element configures a third SN of a splitting protocol layer in a third splitting protocol layer data packet, and configures a fourth SN of the splitting protocol layer in a fourth splitting protocol layer data packet.

It should be noted that the third splitting protocol layer data packet and the fourth splitting protocol layer data packet are data packets sent by the core network element serving as the data sender. The third splitting protocol layer data packet may be referred to as a third data packet of the splitting protocol layer, and the fourth splitting protocol layer data packet may be referred to as a fourth data packet of the splitting protocol layer. The third data packet is different from the fourth data packet. The third data packet may include one or more data packets, and the fourth data packet may include one or more data packets. The third SN corresponds to the first splitting protocol layer data packet, the fourth SN may include one or more SNs, the third SN corresponds to the second splitting protocol layer data packet, and the fourth SN may include one or more SNs.

For an implementation of the splitting protocol layer of the core network element, refer to the foregoing description of FIG. 3. Details are not described herein again.

In a possible solution, the communication method provided in this embodiment may include: The core network element generates first configuration information.

For example, the first configuration information may include one or more of the following: first splitting indication information, a first threshold, a splitting protocol layer entity identifier, SN information, first reordering information, first reordering window information, first QoS flow information, first PDU session information, and first DRB information. For an implementation of the first configuration information, refer to step S401. Details are not described herein again.

In a possible solution, S501 may include: The splitting protocol layer entity of the core network element configures the third SN of the splitting protocol layer in the third splitting protocol layer data packet and configures the fourth SN of the splitting protocol layer in the fourth splitting protocol layer data packet based on the SN information.

In other words, the splitting protocol layer entity of the core network element may configure different SNs of the splitting protocol layer in different data packets at the splitting protocol layer based on the SN information, so that a receiver reorders the data packets based on the SNs in the data packets, to sequentially deliver the data packets.

For an example, refer to the example in which the splitting protocol layer entity of the terminal device configures the SN of the splitting protocol layer in the splitting protocol layer data packet based on the SN information in S401. Details are not described herein again.

In some embodiments, the communication method provided in this embodiment may further include: The core network element sends a first message. Correspondingly, a radio access network device receives the first message.

Optionally, the first message may include the first configuration information, and the first message may indicate the terminal device to determine a splitting protocol layer based on the configuration information.

For an implementation of the first message, refer to S401. Details are not described herein again.

S502. The splitting protocol layer entity of the core network element sends the third splitting protocol layer data packet to a first protocol layer entity corresponding to a first access network device and sends the fourth splitting protocol layer data packet to a first protocol layer entity corresponding to a second access network device.

It should be noted that the first protocol layer entity corresponding to the first access network device and the first protocol layer entity corresponding to the second access network device in S502 are both on a core network element side.

An example may be similar to the example in which the splitting protocol layer entity of the terminal device sends different splitting protocol layer data packets to different access network devices in S402. Details are not described herein again.

In a possible solution, S502 may include: When the first splitting indication information has a first value and an amount of data to be sent by the splitting protocol layer entity of the core network element is greater than or equal to the first threshold, the splitting protocol layer entity of the core network element may send the third splitting protocol layer data packet to the first protocol layer entity corresponding to the first access network device, and send the fourth splitting protocol layer data packet to the first protocol layer entity corresponding to the second access network device. For the first value, refer to S402. Details are not described herein again.

When the splitting protocol layer entity is configured to enable a splitting function, and an amount of to-be-sent data is greater than or equal to the threshold, the splitting protocol layer entity may separately send different data packets to different first protocol layer entities corresponding to different access network devices. In this way, the core network element sends different data packets to different access network devices through N3 interfaces, to send the data packets to the terminal device in splitting mode, so that a data transmission rate can be improved. Forwarding does not need to be performed through an Xn interface between access network devices, to reduce a delay in a data transmission process.

In some embodiments, after a splitting protocol layer data packet is processed layer by layer by the splitting protocol layer entity to an L1 protocol layer entity, the splitting protocol layer data packet is sent to the corresponding first access network device or second access network device through a Uu interface, and then the first access network device or the second access network device sends the splitting protocol layer data packet to the terminal device. Correspondingly, the terminal device receives the data packet, parses the data packet layer by layer from an L1 protocol layer entity to a first protocol layer entity, and performs the following S503 and S504.

S503. The first protocol layer entity of the terminal device sends the third splitting protocol layer data packet and the fourth splitting protocol layer data packet to the splitting protocol layer entity of the terminal device. Correspondingly, the splitting protocol layer entity of the terminal device receives the third splitting protocol layer data packet and the fourth splitting protocol layer data packet from the first protocol layer entity of the terminal device.

With reference to FIG. 4, that a first protocol layer of the terminal device is an SDAP protocol layer is used as an example. After receiving the data packet from the first access network device and the data packet from the second access network device, the terminal device parses the received data packets layer by layer from the L1 protocol layer entity to a SDAP protocol layer entity to obtain a third splitting protocol layer data packet and a fourth splitting protocol layer data packet, and transfers the data packets to the splitting protocol layer entity.

A splitting protocol layer of the terminal device may be determined based on the first configuration information. For an implementation of the first configuration information, refer to S401. Details are not described herein again.

In a possible solution, S503 may include: The first protocol layer entity of the terminal device sends the third splitting protocol layer data packet to the splitting protocol layer entity of the terminal device based on the first QoS flow information; and the first protocol layer entity of the terminal device sends the fourth splitting protocol layer data packet to the splitting protocol layer entity of the terminal device based on the first QoS flow information.

It should be noted that, in this embodiment, the first protocol layer entity that sends the third splitting protocol layer data packet and the first protocol layer entity that sends the fourth splitting protocol layer data packet may be different first protocol layer entities, for example, may be the first protocol layer entity corresponding to the first access network device and the first protocol layer entity corresponding to the second access network device respectively.

For an implementation of the first QoS flow information, refer to step S401. Details are not described herein again.

For example, if the first QoS flow information indicates that a QFI associated with a first splitting protocol layer entity is 5 and a QFI associated with a second splitting protocol layer entity is 6, after being processed by the first protocol layer entity, a data packet whose QFI is 5 is delivered to the associated first splitting protocol layer entity. After being processed by the first protocol layer entity, a data packet whose QFI is 6 is delivered to the associated second splitting protocol layer entity. Functions of different splitting protocol layer entities may be different, so that differentiated processing may be performed on data.

In another possible solution, S503 may include: The first protocol layer entity of the terminal device sends the third splitting protocol layer data packet to the splitting protocol layer entity of the terminal device based on the first PDU session information; and the first protocol layer entity of the terminal device sends the fourth splitting protocol layer data packet to the splitting protocol layer entity of the terminal device based on the first PDU session information.

For a implementation of the first PDU session information, refer to step S401. Details are not described herein again.

An example may be similar to that the first protocol layer entity of the terminal device sends the splitting protocol layer data packet to the splitting protocol layer entity of the terminal device based on the first QoS flow information. Details are not described herein again.

In still another possible solution, S503 may include: The first protocol layer entity of the terminal device sends the third splitting protocol layer data packet to the splitting protocol layer entity of the terminal device based on the first DRB information; and the first protocol layer entity of the terminal device sends the fourth splitting protocol layer data packet to the splitting protocol layer entity of the terminal device based on the first DRB information.

For an implementation of the first DRB information, refer to step S401. Details are not described herein again.

An example is similar to that the first protocol layer entity of the terminal device sends the splitting protocol layer data packet to the splitting protocol layer entity of the terminal device based on the first QoS flow information. Details are not described herein again.

In some embodiments, the communication method provided in this embodiment may further include: The access network element sends the first message. Correspondingly, the terminal device receives the first message.

For an implementation of the first message, refer to S401. Details are not described herein again.

S504. The splitting protocol layer entity of the terminal device sends the parsed third splitting protocol layer data packet and the parsed fourth splitting protocol layer data packet to an upper protocol layer entity of the splitting protocol layer entity in ascending order of SNs in the third SN and the fourth SN.

For example, an upper layer of the splitting protocol layer of the terminal device may be a PDU protocol layer. The terminal device may sort data packets in ascending order of SNs and transfer the data packets to a PDU protocol layer entity. An implementation may be similar to that when the upper protocol layer of the splitting protocol layer of the core network element is a PDU protocol layer, the core network element sorts the data packets in ascending order of SNs and transfers the data packets to the PDU protocol layer entity in S404. Details are not described herein again.

It should be noted that a manner of sorting the data packets by the terminal device is not limited in this embodiment. The manner may be the same as a manner in which a data packet sender allocates an SN to a data packet.

In some embodiments, if the first reordering information has a second value, the splitting protocol layer entity of the terminal device may send the parsed third splitting protocol layer data packet and the parsed fourth splitting protocol layer data packet to the upper protocol layer entity of the splitting protocol layer entity in ascending order of the SNs in the third SN and the fourth SN.

For the second value, refer to S404. Details are not described herein again.

In this way, if there is a requirement for sequentially delivering data packets, the terminal device may sort the received data packets in ascending order of SNs and transfer the data packets to an upper protocol layer entity, to meet the requirement for sequentially delivering data packets.

In some embodiments, when the first reordering information has a second value, and time for the splitting protocol layer entity of the terminal device to wait for a lost splitting protocol layer data packet is greater than or equal to first reordering window information, the splitting protocol layer entity of the terminal device may send received splitting protocol layer data packets to the upper protocol layer entity of the splitting protocol layer entity in ascending order of SNs.

An example may be the example corresponding to the core network element side in S404. Details are not described herein again.

Optionally, the splitting protocol layer entity of the terminal device receives the lost splitting protocol layer data packet and sends the lost splitting protocol layer data packet to the upper protocol layer entity of the splitting protocol layer entity.

In other words, after transferring the received splitting protocol layer data packet to the upper protocol layer entity of the splitting protocol layer entity, the splitting protocol layer entity of the terminal device receives the lost splitting protocol layer data packet, and may transfer the lost splitting protocol layer data packet to the upper protocol layer entity of the splitting protocol layer entity, to perform data transmission.

Based on the communication method shown in FIG. 5, the splitting protocol layer entity of the core network element separately sends different data packets to a first protocol layer entity corresponding to a first access network device and a first protocol layer entity corresponding to a second access network device. In this way, the core network element transmits the data packets to the first access network device and the second access network device through Uu interfaces, to send the data packets to the terminal device in splitting mode, thereby improving a data transmission rate. In addition, data can be prevented from being forwarded through an Xn interface, to reduce a delay in a data transmission process, thereby meeting a high rate requirement and a low delay requirement of data transmission. In addition, the core network element allocates different SNs of splitting protocol layers to different data packets, so that the terminal device receives the data packets, and may sort the data packets based on the SNs, thereby sequentially delivering the data packets to an upper layer.

Figure 6:
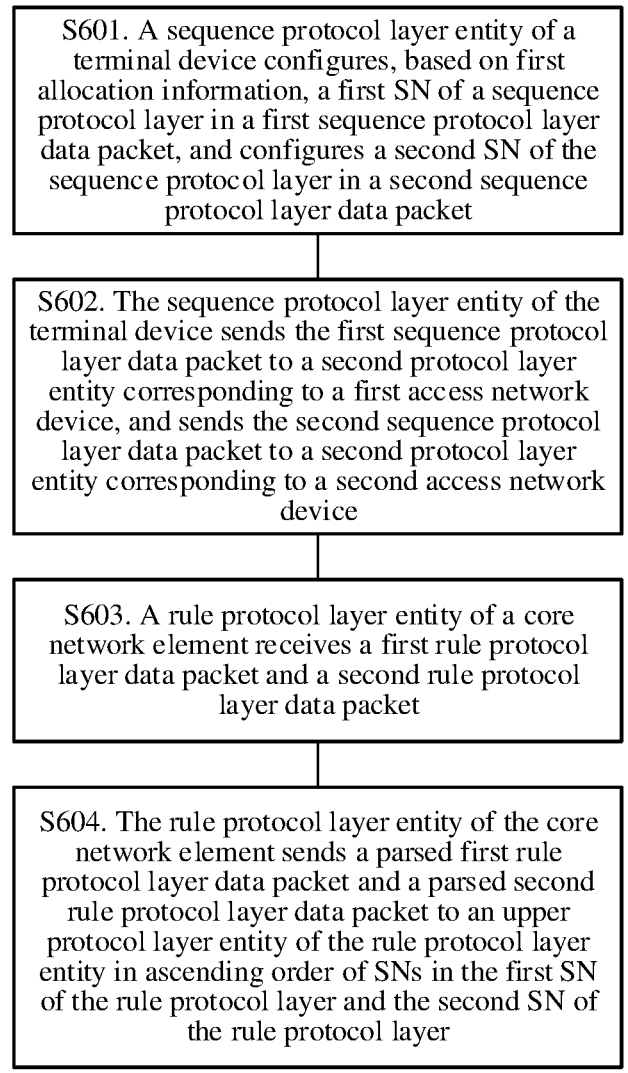
FIG. 6 is a third schematic flowchart of a communication method according to an embodiment.

FIG. 6 is a third schematic flowchart of a communication method according to an embodiment. FIG. 6 is described by using an example in which a terminal device serves as a data sender and a core network element serves as a data receiver. The communication method is applicable to communication between any two nodes shown in FIG. 1.

As shown in FIG. 6, the communication method includes the following steps.

S601. A sequence protocol layer entity of the terminal device configures, based on first allocation information, a first SN of a sequence protocol layer in a first sequence protocol layer data packet, and configures a second SN of the sequence protocol layer in a second sequence protocol layer data packet.

For example, it is assumed that a data packet 1 and a data packet 2 are sequentially transferred to the sequence protocol layer entity. SN=1 may be configured in a header of the data packet 1. To ensure that the SNs are sequentially superimposed, SN=2 is configured in a header of the data packet 2.

It should be noted that the first sequence protocol layer data packet and the second sequence protocol layer data packet are data packets sent by the terminal device serving as the data sender. The first sequence protocol layer data packet may be referred to as a first data packet of the sequence protocol layer, and the second sequence protocol layer data packet may be referred to as a second data packet of the sequence protocol layer. The first data packet is different from the second data packet. The first data packet may include one or more data packets, and the second data packet may include one or more data packets. The first SN of the sequence protocol layer corresponds to the first sequence protocol layer data packet, and the first SN of the sequence protocol layer may include one or more SNs. The second SN of the sequence protocol layer corresponds to the second sequence protocol layer data packet, and the second SN of the sequence protocol layer may include one or more SNs.

It should be noted that for a protocol architecture corresponding to the communication method shown in FIG. 6, refer to corresponding description in FIGS. 4 and S401. The splitting protocol layer shown in FIG. 4 may be not included. Details are not described herein again.

With reference to FIG. 4, the sequence protocol layer of the terminal device may be a configured SDAP protocol layer or a configured PDCP protocol layer. In this embodiment, an example in which the sequence protocol layer of the terminal device is an SDAP protocol layer is used for description.

For example, the first allocation information may indicate allocation rules of SNs of sequence protocol layers corresponding to a first access network device and a second access network device respectively.

The terminal device may allocate SNs to data packets based on the first allocation information so that a data packet receiver can reorder the data packets based on the SNs and can deliver the data packets in sequence.

For example, the first allocation information may include a first allocation rule and a second allocation rule.

The first allocation rule may be an allocation rule corresponding to the first access network device, and the second allocation rule may be an allocation rule corresponding to the second access network device. In other words, the first allocation rule may be an allocation rule corresponding to a sequence protocol layer of the first access network device, and the second allocation rule may be an allocation rule corresponding to a sequence protocol layer of the second access network device.

In some embodiments, the first allocation rule may be obtaining at least one first SN value based on a first initial value and/or a first superimposition value, and the second allocation rule may be obtaining at least one second SN value based on a second initial value and/or a second superimposition value.

Optionally, the first superimposition value is an interval between two adjacent first SN values. The second superimposition value is an interval between two adjacent second SN values. The first initial value and the second initial value are different, and the first superimposition value and the second superimposition value may be the same or different.

For example, it is assumed that a maximum length of an SN is 5, the first initial value is 0, and the first superimposition value is 2. In this case, the at least one first SN value may include 0, 0+2=2, and 2+2=4. It is assumed that the second initial value is 1, and the second superimposition value is 2. In this case, the at least one second SN value may include 1 and 1+2=3.

For another example, it is assumed that a maximum length of an SN is 5, the first initial value is 0, and the first superimposition value is 3. In this case, the at least one first SN value may include 0 and 0+3=3. It is assumed that the second initial value is 1, and the second superimposition values are 1 and 2. 1 is first superimposed to obtain a second SN value, and then 2 is superimposed to obtain a next second SN value. In this case, the at least one second SN value may include 1, 1+1=2, and 2+2=4.

In this way, the first allocation information may be determined based on service volumes of the first access network device and the second access network device, so that a service transmission requirement can be met.

It should be noted that values of the first SN value and the second SN value in the foregoing examples may be replaced with each other, or the first SN value and the second SN value may be calculated in another manner. Values of the first SN value and the second SN value are not limited, provided that the first SN value and the second SN value are different.

Optionally, the first SN may be the at least one first SN value. Assuming that the at least one first SN value includes 0, 2, and 4, the first SN includes 0, 2, and 4. The second SN may be the at least one second SN value. Assuming that the at least one second SN value includes 1 and 3, the second SN includes 1 and 3.

In some other embodiments, the first allocation rule may indicate a value range of an SN of a sequence protocol layer corresponding to the first access network device, and the second allocation rule may indicate a value range of an SN of a sequence protocol layer corresponding to the second access network device.

For example, it is assumed that a maximum length of an SN is 5, the first allocation rule may indicate that a value interval of the SN is 0 to 2, and the second allocation rule may indicate that the value interval of the SN is 3 to 4.

For another example, it is assumed that a maximum length of an SN is 12, the first allocation rule may indicate that a value interval of the SN is 0 to 4 and 10 to 11, and the second allocation rule may indicate that the value interval of the SN is 5 to 9.

In other words, the value ranges of the SNs corresponding to the first access network device and the second access network device respectively may be specified, to prevent the first access network device and the second access network device from allocating a same SN to different data packets, to ensure that data packets are sequentially delivered.

Optionally, the first SN may be obtained according to the first allocation rule. Assuming that a value interval of an SN of a sequence protocol layer corresponding to the first access network device is 0 to 2, the first SN may include 0, 1, and 2. The second SN may be obtained according to the second allocation rule. Assuming that a value interval of an SN of a sequence protocol layer corresponding to the second access network device is 3 to 4, the first SN may include 3 and 4.

In a possible solution, the first access network device may send a fourth message to the terminal device. Correspondingly, the terminal device may receive the fourth message from the first access network device.

Optionally, the fourth message may indicate to configure the sequence protocol layer. In other words, the first access network device may indicate, by using the fourth message, the terminal device to configure the SDAP protocol layer or the PDCP protocol layer. The configured SDAP protocol layer or the configured PDCP protocol layer may be referred to as the sequence protocol layer.

Optionally, the fourth message may include one or more of the following: the first allocation information, mapping information, second splitting indication information, a second threshold, SN information, second reordering information, and second reordering window information.

For example, the mapping information may indicate a mapping relationship between a second QoS flow and a DRB.

For example, the second QoS flow may include one or more QoS flows. For example, the second QoS flow includes a QoS flow whose QFI is 7 and a QoS flow whose QFI is 8. The second QoS flow corresponds to a data packet whose QFI is 7 and a data packet whose QFI is 8. The data packet whose QFI is 7 is associated with a DRB 1, and the data packet whose QFI is 8 is associated with a DRB 2. In this case, the terminal device may transmit the data packet whose QFI is 7 by using an access network device associated with the DRB 1, and transmit the data packet whose QFI is 8 by using an access network device associated with the DRB 2.

For example, the second splitting indication information may indicate whether a sequence protocol layer entity supports sending different data packets to a second protocol layer entity corresponding to the first access network device and a second protocol layer entity corresponding to the second access network device. In other words, the second splitting indication information may indicate whether the sequence protocol layer entity supports sending of data packets in splitting mode.

For example, a second protocol layer is a lower protocol layer of the sequence protocol layer. The diagram of the protocol architecture shown in FIG. 3 is used as an example. The lower protocol layer of the sequence protocol layer (it is assumed that the sequence protocol layer is the SDAP protocol layer) of the terminal device is a PDCP protocol layer, the second protocol layer may be a PDCP protocol layer, and a second protocol layer entity may be a PDCP protocol layer entity.

One or more PDCP protocol layer entities may be created at the PDCP protocol layer, and PDCP protocol layer entities may be in a one-to-one correspondence with access network devices. It is assumed that a first PDCP protocol layer entity and a second PDCP protocol layer entity are created at the PDCP protocol layer, the first PDCP protocol layer entity corresponds to the first access network device, and the second PDCP protocol layer entity corresponds to the second access network device. In this case, the sequence protocol layer entity may send a data packet 0, a data packet 1, and a data packet 2 to the first PDCP protocol layer entity, and send a data packet 3 and a data packet 4 to the second PDCP protocol layer entity.

Optionally, the second splitting indication information may indicate whether the sequence protocol layer entity supports separately sending different data packets to at least two second protocol layer entities corresponding to at least two access network devices.

For example, the second threshold may indicate an amount threshold of to-be-sent data. In other words, the second threshold may indicate an amount threshold of data for data splitting performed by the sequence protocol layer entity.

For example, if an amount of the to-be-sent data is greater than or equal to the second threshold, the sequence protocol layer entity separately sends different data packets to second protocol layer entities corresponding to different access network devices, to improve a data transmission rate. Otherwise, the sequence protocol layer entity sends a data packet to a second protocol layer entity corresponding to an access network device. The access network device may be a master access network device or a secondary access network device, or may be preconfigured. This is not limited in this embodiment.

For example, the SN information may indicate a length of an SN. In other words, the SN information may indicate a maximum length of an SN of the sequence protocol layer. For example, the maximum length of the SN is 5. For another example, the maximum length of the SN is 12.

For example, the second reordering information may indicate whether to reorder received sequence protocol layer data packets in ascending order of SNs.

If the second reordering information indicates yes, after the sequence protocol layer data packets are received, the data packets are sorted in ascending order of SNs in the sequence protocol layer data packets, to meet a requirement of sequentially delivering the data packets. Otherwise, the received sequence protocol layer data packets may not be reordered.

For example, the second reordering window information may indicate maximum time for waiting for a lost sequence protocol layer data packet.

For example, if a sequence protocol layer data packet whose SN is 0 and a sequence protocol layer data packet whose SN is 2 are received, but a sequence protocol layer data packet whose SN is 1 is not received, the sequence protocol layer data packet whose SN is 1 may be referred to as a lost sequence protocol layer data packet. The second reordering window information may be maximum time for waiting for the sequence protocol layer data packet whose SN is 1.

If the time for waiting for the sequence protocol layer data packet whose SN is 1 is greater than the second reordering window information (for example, 2 milliseconds), and the data packet has not been received, the sequence protocol layer data packet whose SN is 0 and the sequence protocol layer data packet whose SN is 2 may be directly delivered to an upper protocol layer entity of the sequence protocol layer in ascending order of SNs, to improve a data transmission rate.

In a possible solution, S601 may include: The sequence protocol layer entity of the terminal device configures, based on the first allocation information and the SN information, the first SN of the sequence protocol layer in the first sequence protocol layer data packet, and configures the second SN of the sequence protocol layer in the second sequence protocol layer data packet.

For example, it is assumed that the SN information indicates that the length of the SN of the sequence protocol layer is 5, and the sequence protocol layer of the terminal device may sequentially allocate SN=0, SN=1, SN=2, SN=3, and SN=4 to data packets from an upper layer. After SN=4 is allocated to a data packet, if there are still other data packets to which no SN is allocated, SNs may be sequentially allocated to the other data packets starting from SN=0.

S602. The sequence protocol layer entity of the terminal device sends the first sequence protocol layer data packet to the second protocol layer entity corresponding to the first access network device, and sends the second sequence protocol layer data packet to the second protocol layer entity corresponding to the second access network device.

It should be noted that the second protocol layer entity corresponding to the first access network device and the second protocol layer entity corresponding to the second access network device in S602 are both on a terminal device side.

With reference to FIG. 4, it is assumed that a PDCP protocol layer of the terminal device is the second protocol layer, the first PDCP protocol layer entity corresponds to the first access network device, and the second PDCP protocol layer entity corresponds to the second access network device. In this case, the sequence protocol layer entity of the terminal device may send a data packet 0, a data packet 1, and a data packet 2 of the sequence protocol layer to the first PDCP protocol layer entity, and send a data packet 3, a data packet 4, and a data packet 5 of the sequence protocol layer to the second PDCP protocol layer entity.

In some embodiments, S602 may include: When the second splitting indication information has a first value and an amount of data to be sent by the sequence protocol layer entity of the terminal device is greater than or equal to the second threshold, the sequence protocol layer entity of the terminal device sends the first sequence protocol layer data packet to the second protocol layer entity corresponding to the first access network device, and sends the second sequence protocol layer data packet to the second protocol layer entity corresponding to the second access network device. For the first value, refer to S402. Details are not described herein again.

When the sequence protocol layer entity is configured to enable a splitting function, and an amount of to-be-sent data is greater than or equal to the threshold, the sequence protocol layer entity may separately send different data packets to different second protocol layer entities corresponding to different access network devices. In this way, the terminal device sends different data packets to different access network devices through Uu interfaces, to send the data packets to the core network element in splitting mode, so that a data transmission rate can be improved. Forwarding does not need to be performed through an Xn interface between access network devices, to reduce a delay in a data transmission process.

In a possible solution, S602 may include: The sequence protocol layer entity of the terminal device sends, based on the mapping information, the first sequence protocol layer data packet to the second protocol layer entity corresponding to the first access network device; and the sequence protocol layer entity of the terminal device sends, based on the mapping information, the second sequence protocol layer data packet to the second protocol layer entity corresponding to the second access network device.

For example, it is assumed that the second QoS flow corresponds to the data packet whose QFI is 7 and the data packet whose QFI is 8, the data packet whose QFI is 7 is associated with the DRB 1, the data packet whose QFI is 8 is associated with the DRB 2, the DRB 1 is associated with the first access network device, and the DRB 2 is associated with the second access network device. In this case, the terminal device may transmit the data packet whose QFI is 7 by using the second protocol layer entity corresponding to the first access network device and transmit the data packet whose QFI is 8 by using the second protocol layer entity corresponding to the second access network device. In this way, data can be sent to the core network element in splitting mode, a data transmission rate can be improved, and forwarding does not need to be performed through an Xn interface between access network devices, thereby reducing a delay in a data transmission process.

In a possible solution, a sequence protocol layer data packet may be processed layer by layer from the sequence protocol layer entity to an L1 protocol layer entity, and then sent to the corresponding first access network device or second access network device through a Uu interface. Correspondingly, the first access network device receives the data packet, parses the data packet layer by layer from an L1 protocol layer entity to the second protocol layer entity, and performs the following step 1 to step 3. After receiving the data packet, the second access network device implements a function similar to that of the first access network device. For details, refer to the following step 1 to step 3. Details are not described herein again.

Step 1: A sequence protocol layer entity of the first access network device receives the first sequence protocol layer data packet from the second protocol layer entity of the first access network device.

A sequence protocol layer of the first access network device may correspond to the sequence protocol layer of the terminal device, a second protocol layer of the first access network device may correspond to a second protocol layer of the terminal device, and the first sequence protocol layer data packet may include a first SN of the sequence protocol layer.

Step 2: A rule protocol layer entity of the first access network device configures a first SN of a rule protocol layer in a first rule protocol layer data packet based on second allocation information.

For example, the second allocation information may indicate allocation rules of SNs of rule protocol layers corresponding to the first access network device and the second access network device respectively.

The first access network device may allocate SNs to data packets based on the second allocation information, so that the data packet receiver can reorder the data packets based on the SNs, and can deliver the data packets in sequence.

For example, the second allocation information may include a third allocation rule and a fourth allocation rule.

The third allocation rule may be an allocation rule corresponding to the first access network device, and the fourth allocation rule may be an allocation rule corresponding to the second access network device.

In some embodiments, the third allocation rule may be obtaining at least one first SN value based on the first initial value and/or the first superimposition value, and the fourth allocation rule may be obtaining at least one second SN value based on the second initial value and/or the second superimposition value.

Optionally, the first superimposition value is an interval between two adjacent first SN values, the second superimposition value is an interval between two adjacent second SN values, the first initial value is different from the second initial value, and the first superimposition value may be the same as or different from the second superimposition value. For examples of the first initial value, the first superimposition value, the first SN value, the second initial value, the second superimposition value, and the second SN value, refer to S601. Details are not described herein again.

Optionally, the first SN may be the at least one first SN value. Assuming that the at least one first SN value includes 0, 2, and 4, the first SN may include 0, 2, and 4.

In some other embodiments, the third allocation rule may indicate a value range of an SN of a rule protocol layer corresponding to the first access network device, and the fourth allocation rule may indicate a value range of an SN of a rule protocol layer corresponding to the second access network device.

For example, it is assumed that a maximum length of an SN is 5, the third allocation rule may indicate that a value interval of the SN is 0 to 2, and the fourth allocation rule may indicate that the value interval of the SN is 3 to 4.

In the foregoing manner, the first access network device and the second access network device are prevented from allocating a same SN to different data packets, to ensure that data packets are sequentially delivered.

Optionally, the first SN may be obtained according to the third allocation rule. Assuming that a value interval of an SN of a rule protocol layer corresponding to the first access network device is 0 to 2, the first SN includes 0, 1, and 2.

Optionally, the first access network device may obtain the first SN in the first sequence protocol layer data packet. In a process of sending data packets to the core network element, the first access network device may sequentially allocate SNs of the rule protocol layer to the data packets based on SNs of the sequence protocol layer.

For example, it is assumed that the first sequence protocol layer data packet includes a data packet 0, a data packet 1, and a data packet 2, the data packet 0, the data packet 1, and the data packet 2 include SN=0, SN=1, and SN=2 of the sequence protocol layer respectively, and SNs of the rule protocol layer of the first access network device are sequentially SN=2, SN=3, and SN=4. In a process in which the first access network device forwards the data packets to the terminal device, the rule protocol layer entity of the first access network device may sequentially allocate SN=2, SN=3, and SN=4 to the data packet 0, the data packet 1, and the data packet 2.

Step 3: The first access network device processes the first rule protocol layer data packet layer by layer from the second protocol layer entity to an L1 protocol layer entity and sends the first rule protocol layer data packet to the core network element. The core network element receives the data packet, parses the data packet layer by layer from an L1 protocol layer entity to a second protocol layer entity, and performs the following S603 and S604.

S603. A rule protocol layer entity of the core network element receives the first rule protocol layer data packet and a second rule protocol layer data packet.

Correspondingly, the second protocol layer entity of the core network element sends the first rule protocol layer data packet and the second rule protocol layer data packet to the rule protocol layer entity of the core network element.

With reference to FIG. 4, that a second protocol layer of the core network element is an IP protocol layer is used as an example. After receiving the data packet from the first access network device and the data packet from the second access network device, the core network element parses the received data packets layer by layer from the L1 protocol layer entity to an IP protocol layer entity to obtain a first rule protocol layer data packet and a second rule protocol layer data packet, and transfers the data packets to the rule protocol layer entity.

For example, the first rule protocol layer data packet may include a first SN of the rule protocol layer, and the second rule protocol layer data packet may include a second SN of the rule protocol layer. The first SN and the second SN of the rule protocol layer may be allocated by the first access network device and the second access network device respectively in step 1 and step 2.

For example, the first rule protocol layer data packet includes a data packet 0, a data packet 1, and a data packet 2, and sequence numbers included in the data packet 0, the data packet 1, and the data packet 2 are SN=0, SN=1, and SN=2 respectively. The second rule protocol layer data packet includes a data packet 3 and a data packet 4, and sequence numbers included in the data packet 3 and the data packet 4 are SN=3 and SN=4 respectively.

In some embodiments, the core network element may send a second message to the first access network device. Correspondingly, the first access network device may receive the second message from the core network element. Optionally, the second message may indicate whether to determine the first allocation information. In other words, the core network element may indicate whether the first access network device exchanges an SN allocation rule with the second access network device, to prevent the first access network device and the second access network device from allocating a same SN to the first rule protocol layer data packet and the second rule protocol layer data packet.

For an implementation of the first allocation information, refer to step S601. Details are not described herein again.

Optionally, the second message may include second PDU session information and/or second QoS flow information.

For example, the second PDU session information may indicate configuration information of a PDU session, the second PDU session information may include whether a sequence protocol layer entity corresponding to a DRB associated with the PDU session determines the first allocation information with the second access network device.

For example, the second QoS flow information may indicate configuration information of a QoS flow, and the second QoS flow information includes whether a sequence protocol layer entity corresponding to a DRB associated with the QoS flow determines the first allocation information with the second access network device.

In other words, the core network element may indicate, by using the second PDU session information and/or the second QoS flow information, whether the first access network device negotiates with the second access network device about an SN allocation rule.

In a possible solution, the communication method provided in this embodiment may further include: The first access network device determines the first allocation information. In other words, the first access network device may determine the allocation rules of the SNs of the sequence protocol layers corresponding to the first access network device and the second access network device respectively.

Optionally, the first access network device may send a third message to the second access network device.

For example, the third message may include the first allocation information. In other words, the first access network device may send the first allocation information to the second access network device.

It should be noted that the first access network device and the second access network device may determine the SN allocation rule through negotiation in another manner. For example, the first access network device may determine the allocation rule of the SN of the sequence protocol layer corresponding to the first access network device, and send the rule to the second access network device. The second access network device may determine, according to the rule, the allocation rule of the SN of the sequence protocol layer corresponding to the second access network device. Alternatively, after receiving the rule, the second access network device sends, to the first access network device, an SN allocation rule that is recommended to be used by the first access network device, to ensure that SNs of the sequence protocol layers corresponding to the first access network device and the second access network device respectively are different.

In some embodiments, the first access network device may determine the second allocation information based on the first allocation information.

For example, it may be assumed that the first allocation rule in the first allocation information, the allocation rule of the SN at the sequence protocol layer corresponding to the first access network device, is: the first initial value being 0, the first superimposition value being 2, and the at least one first SN value including 0, 0+2=2, and 2+2=4. The second allocation rule in the first allocation information, the allocation rule of the SN at the sequence protocol layer corresponding to the second access network device is: the second initial value being 1, the second superimposition value being 2, and the at least one second SN value including 1 and 1+2=3. The third allocation rule and the first allocation rule may comply with a same rule, and the fourth allocation rule and the second allocation rule may comply with a same rule. For example, the third allocation rule is that the first initial value is 0, the first superimposition value is 2, and the at least one first SN value includes 0, 0+2=2, and 2+2=4. The fourth allocation rule is that the second initial value is 1, the second superimposition value is 2, and the at least one second SN value includes 1 and 1+2=3.

For another example, it may be assumed that the first allocation rule indicates that the value interval of the SN is 0 to 2, and the second allocation rule indicates that the value interval of the SN is 3 to 4. The third allocation rule and the first allocation rule may comply with a same rule, and the fourth allocation rule and the second allocation rule may comply with a same rule. The third allocation rule indicates that the value interval of the SN is 0 to 2, and the fourth allocation rule indicates that the value interval of the SN is 3 to 4.

It should be noted that a value of a corresponding SN in the third allocation rule may be different from a value of a corresponding SN in the first allocation rule, and a value of a corresponding SN in the fourth allocation rule may be different from a value of a corresponding SN in the second allocation rule. For example, values of corresponding SNs in the first allocation rule are 0, 2, and 3, and values of corresponding SNs in the third allocation rule may be 2, 3, and 4.

In some other embodiments, the second message may include the second allocation information. In other words, different from a case in which the first access network device determines the second allocation information based on the first allocation information, the second allocation information may be sent by the core network element to the first access network device.

In some embodiments, the first access network device may send the second allocation information to the second access network device. Correspondingly, the second access network device may receive the second allocation information from the first access network device. In other words, after obtaining the second allocation information, the first access network device may send the second allocation information to another access network device, so that different access network devices may allocate different SNs to different data packets, and the data packet receiver may reorder the data packets based on the SNs, so that the data packets can be sequentially delivered.

In some other embodiments, the core network element may send the second allocation information to the second access network device. Correspondingly, the second access network device may receive the second allocation information from the core network element. That is, the second access network device may obtain the second allocation information from the core network element.

In a possible solution, the first access network device may determine the first allocation information based on the second allocation information. In other words, after obtaining the second allocation information from the core network element, the first access network device may determine allocation rules of SNs of sequence protocol layers corresponding to the first access network device and a second access network device respectively. An implementation may be similar to that the first access network device may determine the second allocation information based on the first allocation information. Details are not described herein again.

S604. The rule protocol layer entity of the core network element sends the parsed first rule protocol layer data packet and the parsed second rule protocol layer data packet to an upper protocol layer entity of the rule protocol layer entity in ascending order of SNs in the first SN of the rule protocol layer and the second SN of the rule protocol layer.

For example, an upper protocol layer of the rule protocol layer of the core network element is a PDU protocol layer. It is assumed that the first rule protocol layer data packet includes a data packet 0, a data packet 1, a data packet 2, and sequence numbers corresponding to the data packet 0, the data packet 1, and the data packet 2 are SN=0, SN=1, and SN=2 respectively, the second rule protocol layer data packet includes a data packet 3 and a data packet 4, and sequence numbers corresponding to the data packet 3 and the data packet 4 are SN=3 and SN=4 respectively. The core network element may parse the foregoing data packets, and parsed data packets 0, 1, 2, 3, and 4 may be a data packet 0-1, a data packet 1-1, a data packet 2-1, a data packet 3-1, and a data packet 4-1 respectively. The core network element may sort the data packets in ascending order of the SNs, for example, the data packet 0-1, the data packet 1-1, the data packet 2-1, the data packet 3-1, and the data packet 4-1, and transfer the data packets to a PDU protocol layer entity.

In a possible solution, the rule protocol layer entity of the core network element may obtain third reordering information corresponding to a second quality of service QoS flow.

For example, the second QoS flow may be for transmitting a rule protocol layer data packet.

For example, a QoS parameter corresponding to the second QoS flow may include the third reordering information corresponding to the second QoS flow. For example, the QoS parameter corresponding to the second QoS flow may include in-order delivery of data packets, out-of-order delivery of data packets, or not including in-order delivery of data packets.

For a description of out-of-order delivery of data packets, refer to S404. Details are not described herein again.

For example, the third reordering information may indicate whether to reorder received rule protocol layer data packets in ascending order of SNs.

If the third reordering information indicates yes, after the rule protocol layer data packets are received, the data packets are sorted in ascending order of SNs in the rule protocol layer data packets, to meet a requirement of sequentially delivering the data packets. Otherwise, the received rule protocol layer data packets may not be sorted.

In other words, the core network element may obtain the third reordering information from the QoS parameter corresponding to the second QoS flow. When the QoS parameter corresponding to the second QoS flow includes in-order delivery of data packets, it indicates that received data packets need to be sorted. When the QoS parameter corresponding to the second QoS flow does not include in-order delivery of data packets or includes out-of-order delivery of data packets, it indicates that received data packets do not need to be sorted.

In some embodiments, if the third reordering information has a second value, the rule protocol layer entity of the core network element may send the parsed first rule protocol layer data packet and the parsed second rule protocol layer data packet to the upper protocol layer entity of the rule protocol layer entity in ascending order of the SNs in the first SN and the second SN. For the second value, refer to S404. Details are not described herein again.

For example, when the QoS parameter corresponding to the second QoS flow includes sequentially delivered data packets, the core network element may sort the received data packets in ascending order of SNs, for example, a data packet 0, a data packet 1, a data packet 2, a data packet 3, and a data packet 4, and transfer the data packets to an upper protocol layer entity (for example, the PDU protocol layer entity).

In other words, the core network element may obtain whether there is a requirement for sequentially delivering data packets for the second QoS flow. If there is a requirement for sequentially delivering data packets for the first QoS flow, the core network element sorts the received data packets in ascending order of SNs, and transfers the data packets to an upper protocol layer entity, to meet the requirement for sequentially delivering data packets.

In some embodiments, when the third reordering information has a second value, and time for the rule protocol layer entity of the core network element to wait for a lost rule protocol layer data packet is greater than or equal to third reordering window information, the rule protocol layer entity of the core network element may send received rule protocol layer data packets to the upper protocol layer entity of the rule protocol layer entity in ascending order of SNs.

For example, the third reordering window information may indicate maximum time for waiting for a lost rule protocol layer data packet.

For example, if the rule protocol layer entity of the core network element has received a data packet 0 whose SN is 0 and a data packet 2 whose SN is 2, but has not received a data packet 1 whose SN is 1, the rule protocol layer entity may wait for the data packet 1. If time for waiting for the data packet 1 is greater than the third reordering window information (for example, 2 milliseconds), and the data packet 1 has not been received, the data packet 0 and the data packet 2 may be directly delivered to the upper protocol layer entity of the rule protocol layer in ascending order of SNs, to improve a data transmission rate.

Optionally, the rule protocol layer entity of the core network element receives the lost rule protocol layer data packet, and sends the lost rule protocol layer data packet to the upper protocol layer entity of the rule protocol layer entity.

In other words, after transferring the received rule protocol layer data packet to the upper protocol layer entity of the rule protocol layer entity, the rule protocol layer entity of the core network element receives the lost rule protocol layer data packet, and may transfer the lost rule protocol layer data packet to the upper protocol layer entity of the rule protocol layer entity, to complete data transmission.

It should be noted that the lost complete data packet may include one or more data packets. When the lost rule protocol layer data packet includes a plurality of data packets, the data packets may be sorted in ascending order of SNs, or may not be sorted. This is not limited in this embodiment.

Based on the communication method shown in FIG. 6, the sequence protocol layer entity of the terminal device separately sends different data packets to the second protocol layer entity corresponding to the first access network device and the second protocol layer entity corresponding to the second access network device. In this way, the terminal device transmits the data packets to the first access network device and the second access network device through Uu interfaces, to send the data packets to the core network element in splitting mode, thereby improving a data transmission rate. In addition, data can be prevented from being forwarded through an Xn interface, to reduce a delay in a data transmission process, thereby meeting a high rate requirement and a low delay requirement of data transmission.

In addition, the terminal device allocates different SNs of sequence protocol layers to different data packets based on the first allocation information. An access network device receives the data packets, and allocates different SNs of rule protocol layers to the different data packets based on second allocation information. In this way, the core network element receives the data packets and sorts the data packets based on the SNs, so that the data packets can be sequentially delivered to an upper layer.

Figure 7:
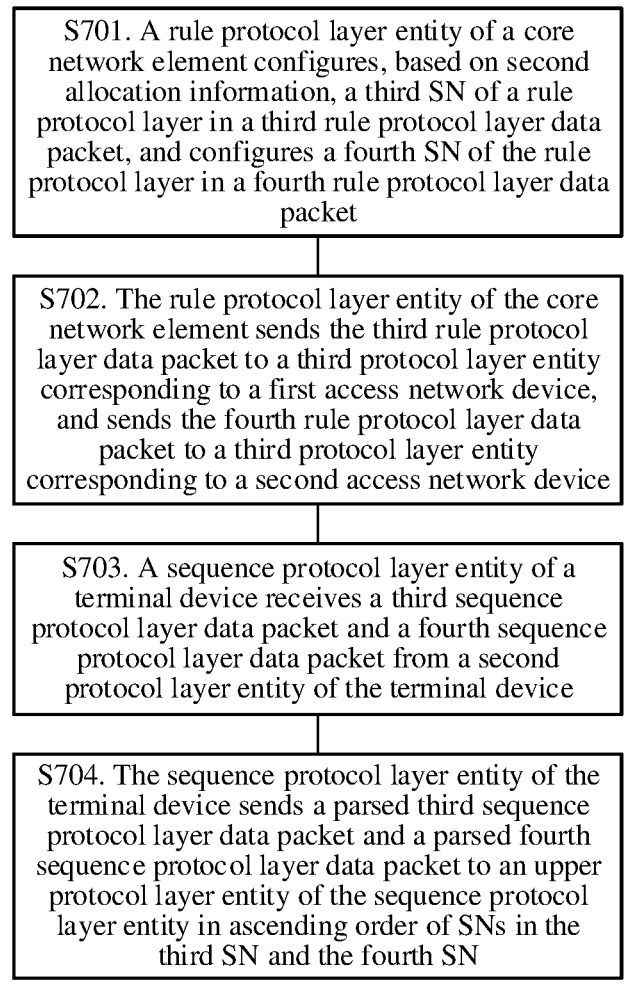
FIG. 7 is a fourth schematic flowchart of a communication method according to an embodiment.

FIG. 7 is a fourth schematic flowchart of a communication method according to an embodiment. FIG. 7 is described by using an example in which a core network element serves as a data sender and a terminal device serves as a data receiver. The communication method is applicable to communication between any two nodes shown in FIG. 1.

As shown in FIG. 7, the communication method includes the following steps.

S701. A rule protocol layer entity of the core network element configures, based on second allocation information, a third SN of a rule protocol layer in a third rule protocol layer data packet, and configures a fourth SN of the rule protocol layer in a fourth rule protocol layer data packet.

For example, it is assumed that a data packet 1 and a data packet 2 are sequentially transferred to the rule protocol layer entity. SN=1 may be configured in a header of the data packet 1. To ensure that the SNs are sequentially superimposed, SN=2 is configured in a header of the data packet 2.

It should be noted that the third rule protocol layer data packet and the fourth rule protocol layer data packet are data packets sent by the core network element serving as the data sender. The third rule protocol layer data packet may be referred to as a third data packet of the rule protocol layer, and the fourth rule protocol layer data packet may be referred to as a fourth data packet of the rule protocol layer. The third data packet is different from the fourth data packet. The third data packet may include one or more data packets, and the fourth data packet may include one or more data packets. The third SN corresponds to the first rule protocol layer data packet, the fourth SN may include one or more SNs, the third SN corresponds to the second rule protocol layer data packet, and the fourth SN may include one or more SNs.

With reference to FIG. 4, the rule protocol layer of the core network element may be a GTP protocol layer.

For example, the second allocation information may indicate allocation rules of SNs of rule protocol layers corresponding to a first access network device and a second access network device respectively. For an implementation of the second allocation information, refer to the foregoing step 2.

In some embodiments, the core network element may send a second message to the first access network device. Correspondingly, the first access network device may receive the second message from the core network element. For an implementation, refer to S603. Details are not described herein again.

In a possible solution, the communication method provided in this embodiment may further include: The core network element generates the second allocation information.

Optionally, the second message may include the second allocation information. The core network element may send the second allocation information to the first access network device, so that the first access network device allocates an SN to a data packet when transmitting the data packet to the core network element.

Optionally, the core network element may send the second allocation information to the second access network device. In this way, when transmitting a data packet to the core network element, the second access network device can allocate an SN to the data packet based on the second allocation information, to prevent the first access network device and the second access network device from allocating a same SN to different data packets.

Alternatively, optionally, the first access network device sends the second allocation information to the second access network device.

In a possible solution, S701 may include: The rule protocol layer entity of the core network element configures, based on the second allocation information and SN information, the third SN of the rule protocol layer in the third rule protocol layer data packet, and configures the fourth SN of the rule protocol layer in the fourth rule protocol layer data packet.

In other words, the rule protocol layer entity of the core network element may configure different SNs of the rule protocol layer in different data packets at the rule protocol layer based on the SN information, so that a receiver reorders the data packets based on the SNs in the data packets, to sequentially deliver the data packets.

For example, it is assumed that the SN information indicates that a length of an SN of the rule protocol layer is 5, and the rule protocol layer of the core network element may sequentially allocate SN=0, SN=1, SN=2, SN=3, and SN=4 to data packets. After SN=4 is allocated to a data packet, if there are still other data packets to which no SN is allocated, SNs may be sequentially allocated to the other data packets starting from SN=0.

S702. The rule protocol layer entity of the core network element sends the third rule protocol layer data packet to a third protocol layer entity corresponding to the first access network device, and sends the fourth rule protocol layer data packet to a third protocol layer entity corresponding to the second access network device.

It should be noted that the third protocol layer entity corresponding to the first access network device and the third protocol layer entity corresponding to the second access network device in S702 are both on a core network element side.

With reference to FIG. 4, it is assumed that an IP protocol layer of the core network element is a third protocol layer of the core network element, a first IP protocol layer entity corresponds to the first access network device, and a second IP protocol layer entity corresponds to the second access network device. In this case, the rule protocol layer entity of the core network element may send a data packet 0, a data packet 1, and a data packet 2 of the rule protocol layer to the first IP protocol layer entity, and send a data packet 3, a data packet 4, and a data packet 5 of the rule protocol layer to the second IP protocol layer entity.

In a possible solution, S701 may include: When third splitting indication information has a first value, and an amount of data to be sent by the rule protocol layer entity of the core network element is greater than or equal to a third threshold, the rule protocol layer entity of the core network element may send the third rule protocol layer data packet to the third protocol layer entity corresponding to the first access network device, and send the fourth rule protocol layer data packet to the third protocol layer entity corresponding to the second access network device. For the first value, refer to S402. Details are not described herein again.

For example, the third splitting indication information may indicate whether a rule protocol layer entity supports sending different data packets to the third protocol layer entity corresponding to the first access network device and the third protocol layer entity corresponding to the second access network device.

In other words, the third splitting indication information may indicate whether the rule protocol layer entity supports sending of data packets in splitting mode.

For example, a third protocol layer is a lower protocol layer of the rule protocol layer. The diagram of the protocol architecture shown in FIG. 3 is used as an example. The lower protocol layer of the rule protocol layer (GTP protocol layer) of the core network element is an IP protocol layer, the third protocol layer may be an IP protocol layer, and the third protocol layer entity may be an IP protocol layer entity.

One or more IP protocol layer entities may be created at the IP protocol layer, and IP protocol layer entities may be in a one-to-one correspondence with access network devices. It is assumed that a first IP protocol layer entity and a second IP protocol layer entity are created at the IP protocol layer, the first IP protocol layer entity corresponds to the first access network device, and the second IP protocol layer entity corresponds to the second access network device. In this case, the rule protocol layer entity may send a data packet 0, a data packet 1, and a data packet 2 to the first IP protocol layer entity, and send a data packet 3 and a data packet 4 to the second IP protocol layer entity.

Optionally, the third splitting indication information may indicate whether the rule protocol layer entity supports separately sending different data packets to at least two third protocol layer entities corresponding to at least two access network devices.

For example, the third threshold may indicate an amount threshold of to-be-sent data. In other words, the third threshold may indicate an amount threshold of data for data splitting performed by the rule protocol layer entity.

For example, if an amount of the to-be-sent data is greater than or equal to the third threshold, the rule protocol layer entity separately sends different data packets to third protocol layer entities corresponding to different access network devices, to improve a data transmission rate. Otherwise, the rule protocol layer entity sends a data packet to a third protocol layer entity corresponding to an access network device. The access network device may be a master access network device or a secondary access network device, or may be preconfigured. This is not limited in this embodiment.

When the rule protocol layer entity is configured to enable a splitting function, and an amount of to-be-sent data is greater than or equal to the threshold, the rule protocol layer entity may separately send different data packets to different third protocol layer entities corresponding to different access network devices. In this way, the core network element sends different data packets to different access network devices through N3 interfaces, to send the data packets to the terminal device in splitting mode, so that a data transmission rate can be improved. Forwarding does not need to be performed through an Xn interface between access network devices, to reduce a delay in a data transmission process.

In a possible solution, a rule protocol layer data packet may be processed layer by layer from the rule protocol layer entity to an L1 protocol layer entity, and then sent to the corresponding first access network device or second access network device through a Uu interface. Correspondingly, the first access network device receives the data packet, parses the data packet layer by layer from an L1 protocol layer entity to the third protocol layer entity, and performs the following step 4 to step 6. After receiving the data packet, the second access network device may implement a function similar to that of the first access network device. For details, refer to the following step 4 to step 6. Details are not described herein again.

Step 4: A rule protocol layer entity of the first access network device receives the third rule protocol layer data packet from the third protocol layer entity of the first access network device.

A rule protocol layer of the first access network device may correspond to the rule protocol layer of the core network element, a third protocol layer of the first access network device may correspond to the third protocol layer of the core network element, and the third rule protocol layer data packet may include the third SN of the rule protocol layer.

Step 5: A sequence protocol layer entity of the first access network device configures a third SN of a sequence protocol layer in a third sequence protocol layer data packet based on first allocation information.

For an implementation of the first allocation information, refer to step S601. Details are not described herein again.

The first access network device may allocate SNs to data packets based on the first allocation information, so that a data packet receiver can reorder the data packets based on the SNs and can deliver the data packets in sequence.

Optionally, the third SN may be the at least one first SN value. Assuming that the at least one first SN value includes 0, 2, and 4, the third SN may include 0, 2, and 4.

Optionally, the third SN may be obtained according to a first allocation rule. Assuming that a value interval of an SN of the sequence protocol layer corresponding to the first access network device is 0 to 2, the third SN includes 0, 1, and 2.

For example, it is assumed that the third rule protocol layer data packet includes a data packet 0, a data packet 1, and a data packet 2, the data packet 0, the data packet 1, and the data packet 2 include SN=0, SN=1, and SN=2 of the rule protocol layer respectively. SNs of the sequence protocol layer of the first access network device are sequentially SN=2, SN=3, and SN=4. In a process in which the first access network device forwards a data packet to the terminal device, the sequence protocol layer entity of the first access network device may sequentially allocate SN=2, SN=3, and SN=4 to the data packet 0, the data packet 1, and the data packet 2.

Step 6: The first access network device processes the third sequence protocol layer data packet layer by layer from a second protocol layer entity to an L1 protocol layer entity, and sends the third sequence protocol layer data packet to the terminal device. The terminal device receives the data packet, parses the data packet layer by layer from an L1 protocol layer entity to a second protocol layer entity, and performs the following S703 and S704.

S703. A sequence protocol layer entity of the terminal device receives the third sequence protocol layer data packet and a fourth sequence protocol layer data packet from the second protocol layer entity of the terminal device.

Correspondingly, the second protocol layer entity of the terminal device sends the third sequence protocol layer data packet and the fourth sequence protocol layer data packet to the sequence protocol layer entity of the terminal device.

With reference to FIG. 4, that a second protocol layer of the terminal device is a PDCP protocol layer is used as an example. After receiving the data packet from the first access network device and the data packet from the second access network device, the terminal device parses the received data packets layer by layer from the L1 protocol layer entity to a PDCP protocol layer entity to obtain a third sequence protocol layer data packet and a fourth sequence protocol layer data packet, and transfers the data packets to the sequence protocol layer entity.

For example, the third sequence protocol layer data packet may include a third SN of a sequence protocol layer, and the fourth sequence protocol layer data packet may include a fourth SN of the sequence protocol layer. The third SN and the fourth SN of the sequence protocol layer may be allocated by the core network element to the data packets in S701.

For example, the third sequence protocol layer data packet includes a data packet 0, a data packet 1, and a data packet 2, and sequence numbers included in the data packet 0, the data packet 1, and the data packet 2 are SN=0, SN=1, and SN=2 respectively. The fourth sequence protocol layer data packet includes a data packet 3 and a data packet 4, and sequence numbers included in the data packet 3 and the data packet 4 are SN=3 and SN=4 respectively.

In a possible solution, the communication method provided in this embodiment may further include: The terminal device receives a fourth message from the first access network device.

For an implementation of the fourth message, refer to S601. Details are not described herein again.

S704. The sequence protocol layer entity of the terminal device sends the parsed third sequence protocol layer data packet and the parsed fourth sequence protocol layer data packet to an upper protocol layer entity of the sequence protocol layer entity in ascending order of SNs in the third SN and the fourth SN.

For example, an upper layer of the sequence protocol layer of the terminal device may be a PDU protocol layer. The terminal device may sort data packets in ascending order of SNs and may transfer the data packets to a PDU protocol layer entity. An example may be similar to that when the upper protocol layer of the splitting protocol layer of the core network element is a PDU protocol layer, the core network element sorts the data packets in ascending order of SNs and transfers the data packets to the PDU protocol layer entity in S604. Details are not described herein again.

It should be noted that a manner of sorting the data packets by the terminal device is not limited in this embodiment. The manner may be the same as a manner in which a data packet sender allocates an SN to a data packet.

In some embodiments, if second reordering information has a second value, the sequence protocol layer entity of the terminal device may send the parsed third sequence protocol layer data packet and the parsed fourth sequence protocol layer data packet to the upper protocol layer entity of the sequence protocol layer entity in ascending order of the SNs in the third SN and the fourth SN. For the second value, refer to S404. Details are not described herein again.

In this way, if there is a requirement for sequentially delivering data packets, the terminal device may sort the received data packets in ascending order of SNs and may transfer the data packets to an upper protocol layer entity, to meet the requirement for sequentially delivering data packets.

In some embodiments, when the second reordering information has a second value, and time for the sequence protocol layer entity of the terminal device to wait for a lost sequence protocol layer data packet is greater than or equal to the second reordering window information, the sequence protocol layer entity of the terminal device may send received sequence protocol layer data packets to the upper protocol layer entity of the sequence protocol layer entity in ascending order of SNs of the sequence protocol layer.

For example, if the sequence protocol layer entity of the terminal device has received a data packet 0 whose SN is 0 and a data packet 2 whose SN is 2, but has not received a data packet 1 whose SN is 1, the sequence protocol layer entity may wait for the data packet 1. If time for waiting for the data packet 1 is greater than the second reordering window information (for example, 2 milliseconds), and the data packet 1 has not been received, the data packet 0 and the data packet 2 may be directly delivered to the upper protocol layer entity of the sequence protocol layer in ascending order of SNs, to improve a data transmission rate.

Optionally, the sequence protocol layer entity of the terminal device receives the lost sequence protocol layer data packet and sends the lost sequence protocol layer data packet to the upper protocol layer entity of the sequence protocol layer entity.

In other words, after transferring the received sequence protocol layer data packet to the upper protocol layer entity of the sequence protocol layer entity, the sequence protocol layer entity of the terminal device receives the lost sequence protocol layer data packet, and may transfer the lost sequence protocol layer data packet to the upper protocol layer entity of the sequence protocol layer entity, to perform data transmission.

It should be noted that the lost sequence protocol layer data packet may include one or more data packets. When the lost sequence protocol layer data packet includes a plurality of data packets, the data packets may be sorted in ascending order of SNs, or may not be sorted. This is not limited in this embodiment.

Based on the communication method shown in FIG. 7, the rule protocol layer entity of the core network element separately sends different data packets to the third protocol layer entity corresponding to the first access network device and the third protocol layer entity corresponding to the second access network device. In this way, the core network element transmits the data packets to the first access network device and the second access network device through Uu interfaces, to send the data packets to the terminal device in splitting mode, thereby improving a data transmission rate. In addition, data can be prevented from being forwarded through an Xn interface, to reduce a delay in a data transmission process, thereby meeting a high rate requirement and a low delay requirement of data transmission.

In addition, the core network element allocates different sequence numbers SNs of rule protocol layers to different data packets based on second allocation information. An access network device receives the data packets, and allocates different sequence numbers SNs of sequence protocol layers to the different data packets based on first allocation information. In this way, the terminal device receives the data packets and sorts the data packets based on the SNs, so that the data packets can be sequentially delivered to an upper layer.

It may be understood that, to implement functions in the foregoing embodiments, the core network element, the access network device, and the terminal device include corresponding hardware structures and/or software modules for performing the functions. A person skilled in the art should easily be aware that, in combination with the units and the method steps in the examples described in the embodiments may be implemented by hardware, software, or a combination of hardware and software. Whether a function is performed by hardware, software, or hardware driven by computer software depends on particular application scenarios.

Figure 8:
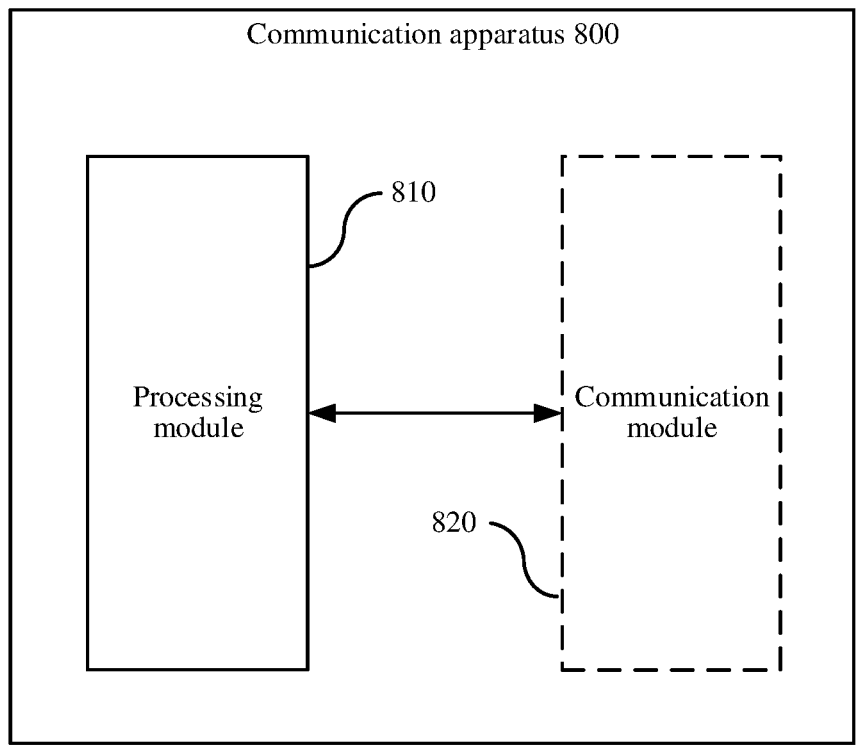
FIG. 8 is a first schematic diagram of a structure of a communication apparatus according to an embodiment.

FIG. 8 is a first schematic diagram of a structure of a communication apparatus according to an embodiment.

In a possible implementation, the communication apparatus 800 may be a terminal device, and can implement the method on the terminal device side in the method embodiment shown in FIG. 4, FIG. 5, FIG. 6, or FIG. 7. Alternatively, the communication apparatus 800 may be an apparatus that can support the terminal device in implementing the method. The communication apparatus 800 may be disposed on the terminal device or used in cooperation with the terminal device.

In another possible implementation, the communication apparatus 800 may be a core network element, and can implement the method on the core network element side in the method embodiment shown in FIG. 4, FIG. 5, FIG. 6, or FIG. 7. Alternatively, the communication apparatus 800 may be an apparatus that can support the core network element in implementing the method. The communication apparatus 800 may be disposed on the core network element or used in cooperation with the core network element.

In still another possible implementation, the communication apparatus 800 may be an access network device, and can implement the method on a first access network device side or a second access network device side in the method embodiment shown in FIG. 4, FIG. 5, FIG. 6, or FIG. 7. Alternatively, the communication apparatus 800 may be an apparatus that can support a first access network device or a second access network device in implementing the method. The communication apparatus 800 may be disposed on the first access network device or the second access network device, or used in cooperation with the first access network device or the second access network device.

The communication apparatus 800 may be a hardware structure, a software module, or a combination of the hardware structure and the software module. The communication apparatus 800 may be implemented by a chip system. In this embodiment, the chip system may include a chip, or may include a chip and another discrete component. The communication apparatus 800 includes a processing module 810 and a communication module 820. The processing module 810 may generate a signal to be sent, and may send the signal by using the communication module 820. The processing module 810 may receive a signal by using the communication module 820, and process the received signal. The processing module 810 is coupled to the communication module 820.

The coupling in this embodiment is indirect coupling or connection between apparatuses, units, or modules for information exchange between the apparatuses, the units, or the modules, and may be in electrical, mechanical, or other forms. The coupling may be a wired connection or a wireless connection.

In this embodiment, the communication module may be a circuit, a module, a bus, an interface, a transceiver, a pin, or another apparatus that can implement a transceiver function. This is not limited in this embodiment.

Figure 9:
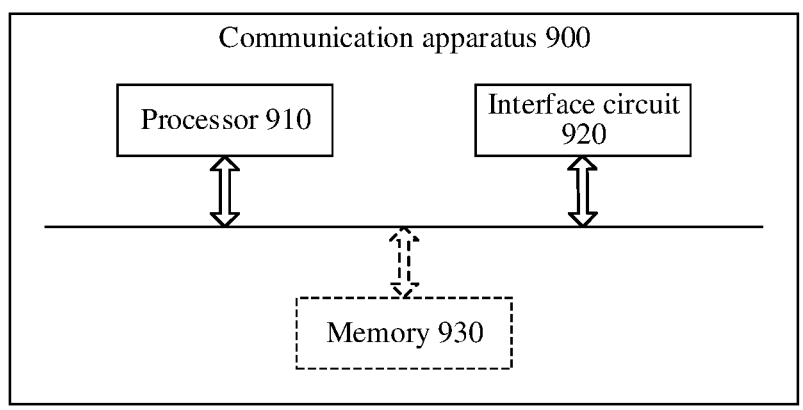
FIG. 9 is a second schematic diagram of a structure of a communication apparatus according to an embodiment.

FIG. 9 is a second schematic diagram of a structure of a communication apparatus according to an embodiment.

In a possible implementation, the communication apparatus 900 may be a terminal device, and can implement the method on the terminal device side provided in the embodiments. Alternatively, the communication apparatus 900 may be an apparatus that can support the terminal device in implementing the method, for example, a chip system. The communication apparatus 900 may be disposed on the terminal device or used in cooperation with the terminal device.

In another possible implementation, the communication apparatus 900 may be an access network device and may implement the method on a network side provided in the embodiments. Alternatively, the communication apparatus 900 may be an apparatus that can support the access network device in implementing the method, for example, a chip system. The communication apparatus 900 may be disposed on the access network device or used in cooperation with the access network device.

In still another possible implementation, the communication apparatus 900 may be a core network element and may implement the method on a network side provided in the embodiments. Alternatively, the communication apparatus 900 may be an apparatus that can support the core network element in implementing the method, for example, a chip system. The communication apparatus 900 may be disposed on the core network element or used in cooperation with the core network element.

As shown in FIG. 9, the communication apparatus 900 includes a processor 910 and an interface circuit 920. The processor 910 and the interface circuit 920 are coupled to each other. It can be understood that the interface circuit 920 may be a transceiver or an input/output interface. Optionally, the communication apparatus 900 may further include a memory 930, configured to store instructions that can be executed by the processor 910, store input data for the processor 910 to run instructions, and/or store data generated after the processor 910 runs instructions.

When the communication apparatus 900 is configured to implement the method shown in FIG. 4, FIG. 5, FIG. 6, or FIG. 7, the processor 910 is configured to perform a function of the processing module 810, and the interface circuit 920 is configured to perform a function of the communication module 820.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in an access network device, the chip in the access network device implements functions of the access network device in the foregoing method embodiments. The chip in the access network device receives information from another module (for example, a radio frequency module or an antenna) in the access network device, where the information is sent by a terminal device or a core network element to the access network device. Alternatively, the chip in the access network device sends information to another module (for example, a radio frequency module or an antenna) in the access network device, where the information is sent by the access network device to a terminal device or a core network element.

When the communication apparatus is a chip used in a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

The processor in the embodiments may be a central processing unit (CPU). The processor may alternatively be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

In the embodiments, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Additionally, the storage medium may alternatively be a component of the processor. The processor and the storage medium may be disposed in an ASIC. In addition, the ASIC may be located in a core network element, an access network device, or a terminal device. Also, the processor and the storage medium may alternatively exist in the core network element, the access network device, or the terminal device as discrete components.

All or some of the foregoing embodiments may be implemented by using software, hardware, firmware, or any combination thereof. When software is used to implement embodiments, all or some of the embodiments may be implemented in a form of a computer program product. The computer program product includes one or more computer programs or instructions. When the computer programs or the instructions are loaded and executed on a computer, the procedures or the functions according to the embodiments are all or partially implemented. The computer may be a general-purpose computer, a dedicated computer, a computer network, a core network element, an access network device, a terminal device, or another programmable apparatus. The computer programs or the instructions may be stored in a non-transitory computer-readable storage medium. The non-transitory computer-readable storage medium may be any non-transitory usable medium accessible by a computer, or a data storage device such as a server integrating one or more usable media. The non-transitory usable medium may be a magnetic medium such as a floppy disk, a hard disk drive, or a magnetic tape, may be an optical medium, for example, a DVD, or may be a semiconductor medium, for example, a solid state drive (SSD).

In the embodiments, unless otherwise stated or there is a logic conflict, terms and/or descriptions between different embodiments are consistent and may be mutually referenced, and features in different embodiments may be combined based on an internal logical relationship thereof, to form a new embodiment.

It may be understood that various numbers in embodiments are merely used for differentiation for ease of description and are not used to limit the scope of embodiments. The sequence numbers of the foregoing processes do not mean execution sequences, and the execution sequences of the processes should be determined based on functions and internal logic of the processes.

What is claimed is:

1. A communication method, comprising:
configuring, by a splitting protocol layer entity of a terminal device, a first sequence number (SN) of a splitting protocol layer in a first splitting protocol layer data packet, and configuring a second SN of the splitting protocol layer in a second splitting protocol layer data packet, wherein the splitting protocol layer is a protocol layer above a service data adaptation protocol (SDAP) layer, the splitting protocol layer is determined based on first configuration information, and the first configuration information further comprises one or more of the following: first quality of service (QOS) flow information, first protocol data unit (PDU) session information, and first data radio bearer (DRB) information; and
sending, by the splitting protocol layer entity of the terminal device, the first splitting protocol layer data packet to a first protocol layer entity corresponding to a first access network device; and
sending the second splitting protocol layer data packet to a first protocol layer entity corresponding to a second access network device;
wherein the first configuration information comprises first splitting indication information and/or a first threshold, the first splitting indication information indicates whether a splitting protocol layer entity supports sending different data packets to the first protocol layer entity corresponding to the first access network device and the first protocol layer entity corresponding to the second access network device, and the first threshold indicates an amount threshold of to-be-sent data; and
wherein sending, by the splitting protocol layer entity of the terminal device, the first splitting protocol layer data packet to the first protocol layer entity corresponding to the first access network device, and sending the second splitting protocol layer data packet to the first protocol layer entity corresponding to the second access network device further comprises:
when the first splitting indication information has a first value and an amount of data to be sent by the splitting protocol layer entity of the terminal device is greater than or equal to the first threshold,
sending, by the splitting protocol layer entity of the terminal device, the first splitting protocol layer data packet to the first protocol layer entity corresponding to the first access network device, and
sending the second splitting protocol layer data packet to the first protocol layer entity corresponding to the second access network device.

2. The communication method according to claim 1, wherein the first QoS flow information indicates a QoS flow identifier corresponding to the splitting protocol layer entity, the first PDU session information indicates a PDU session identifier corresponding to the splitting protocol layer entity, and the first DRB information indicates a DRB identifier corresponding to the splitting protocol layer entity.

3. The communication method according to claim 1, wherein sending, by the splitting protocol layer entity of the terminal device, the first splitting protocol layer data packet to the first protocol layer entity corresponding to the first access network device, and sending the second splitting protocol layer data packet to the first protocol layer entity corresponding to the second access network device further comprises:

sending, by the splitting protocol layer entity of the terminal device based on the first QoS flow information, the first PDU session information, or the first DRB information, the first splitting protocol layer data packet to the first protocol layer entity corresponding to the first access network device; and sending, by the splitting protocol layer entity of the terminal device based on the first QoS flow information, the first PDU session information, or the first DRB information, the second splitting protocol layer data packet to the first protocol layer entity corresponding to the second access network device.

4. The communication method according to claim 1, further comprising:

receiving, by the terminal device, a first message, wherein the first message comprises the first configuration information, and the first message indicates the terminal device to determine the splitting protocol layer based on the first configuration information.

5. A communication apparatus, comprising:
at least one processor; and
a memory coupled to the at least one processor and configured to store instructions executable by the at least one processor to cause the apparatus to:
configure a first sequence number (SN) of a splitting protocol layer in a first splitting protocol layer data packet, and configure a second SN of the splitting protocol layer in a second splitting protocol layer data packet, wherein the splitting protocol layer is a protocol layer above a service data adaptation protocol (SDAP) layer, the splitting protocol layer is determined based on first configuration information, and the first configuration information further comprises one or more of the following: first quality of service (QOS) flow information, first protocol data unit (PDU) session information, and first data radio bearer (DRB) information; and
send the first splitting protocol layer data packet to a first protocol layer entity corresponding to a first access network device; and
sending the second splitting protocol layer data packet to a first protocol layer entity corresponding to a second access network device;
wherein the first configuration information comprises first splitting indication information and/or a first threshold, the first splitting indication information indicates whether a splitting protocol layer entity supports sending different data packets to the first protocol layer entity corresponding to the first access network device and the first protocol layer entity corresponding to the second access network device, and the first threshold indicates an amount threshold of to-be-sent data;

wherein the instructions are executable by the at least one processor to further cause the apparatus to:
when the first splitting indication information has a first value and an amount of data to be sent by the splitting protocol layer entity of the terminal device is greater than or equal to the first threshold, send, the first splitting protocol layer data packet to the first protocol layer entity corresponding to the first access network device, and send the second splitting protocol layer data packet to the first protocol layer entity corresponding to the second access network device.

6. The communication apparatus according to claim 5, wherein the first QoS flow information indicates a QoS flow identifier corresponding to the splitting protocol layer entity, the first PDU session information indicates a PDU session identifier corresponding to the splitting protocol layer entity, and the first DRB information indicates a DRB identifier corresponding to the splitting protocol layer entity.

7. The communication apparatus according to claim 5, wherein the instructions are executable by the at least one processor to further cause the apparatus to:
send, based on the first QoS flow information, the first PDU session information, or the first DRB information, the first splitting protocol layer data packet to the first protocol layer entity corresponding to the first access network device; and
send, based on the first QoS flow information, the first PDU session information, or the first DRB information, the second splitting protocol layer data packet to the first protocol layer entity corresponding to the second access network device.

8. The communication apparatus according to claim 5, wherein the instructions are executable by the at least one processor to further cause the apparatus to:
receive a first message, wherein the first message comprises the first configuration information, and the first message indicates the terminal device to determine the splitting protocol layer based on the first configuration information.

* * * * *